US 6,532,408 B1

(12) United States Patent
Breed

(10) Patent No.: US 6,532,408 B1
(45) Date of Patent: *Mar. 11, 2003

(54) SMART AIRBAG SYSTEM

(75) Inventor: David S. Breed, Boonton Township, Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/865,525

(22) Filed: May 29, 1997

(51) Int. Cl.⁷ .............................. G06F 7/00; G05D 3/00
(52) U.S. Cl. ........................ 701/45; 701/46; 280/735; 280/742; 180/282
(58) Field of Search .................... 701/36, 45, 46, 701/47; 280/735, 728.2, 730.1, 738, 737, 734, 742, 728.1; 180/282, 274, 273, 271; 307/10.1; 340/669, 429, 436

(56) References Cited

U.S. PATENT DOCUMENTS

| | | | |
|---|---|---|---|
| 4,257,103 A | | 3/1981 | Goodrich .................... 340/436 |
| 5,049,814 A | | 9/1991 | Walker, III et al. ..... 324/158 R |
| 5,157,268 A | | 10/1992 | Spies et al. ................ 307/10.1 |
| 5,173,614 A | | 12/1992 | Woehrl et al. ............. 307/10.1 |
| 5,232,243 A | | 8/1993 | Blackburn et al. .......... 280/732 |
| 5,282,134 A | * | 1/1994 | Gioutsos et al. .............. 701/45 |
| 5,330,226 A | | 7/1994 | Gentry et al. ............... 280/735 |
| 5,363,302 A | * | 11/1994 | Allen et al. .................... 701/46 |
| 5,365,114 A | | 11/1994 | Tsurushima et al. ....... 307/10.1 |
| 5,366,241 A | | 11/1994 | Kithil ........................ 280/735 |
| 5,377,108 A | | 12/1994 | Nishio ......................... 701/45 |
| 5,377,201 A | | 12/1994 | Chakradhar et al. .......... 371/23 |
| 5,394,326 A | * | 2/1995 | Liu ............................. 701/46 |
| 5,418,722 A | | 5/1995 | Cashier ........................ 701/45 |
| 5,439,249 A | | 8/1995 | Steffens, Jr. et al. ........ 280/735 |
| 5,445,413 A | | 8/1995 | Rudolf et al. ............... 280/735 |
| 5,446,661 A | * | 8/1995 | Gioutsos et al. .............. 701/45 |
| 5,449,198 A | | 9/1995 | Jeenicke et al. ............. 280/735 |
| 5,454,591 A | | 10/1995 | Mazur et al. ................ 280/735 |
| 5,461,566 A | | 10/1995 | Musser ......................... 701/45 |
| 5,461,567 A | | 10/1995 | Kelley et al. .................. 701/45 |
| 5,468,013 A | * | 11/1995 | Gille .......................... 280/729 |
| 5,474,327 A | | 12/1995 | Schousek .................... 280/735 |
| 5,482,314 A | * | 1/1996 | Corrado et al. ............... 701/45 |
| 5,483,449 A | | 1/1996 | Caruso et al. ................ 701/45 |
| 5,504,379 A | * | 4/1996 | Mazur et al. .............. 307/10.1 |

(List continued on next page.)

OTHER PUBLICATIONS

"A Critique of Single Point Sensing", Society of Automotive Engineers, David S. Breed et al., Paper No. 920124, 1992.
"Using Vehicle Deformation to Sense Crashes", David S. Breed et al., Presented at the International Body Engineering Conference, Sep. 21, 1993–Sep. 23, 1993.

(List continued on next page.)

Primary Examiner—Jacques H. Louis-Jacques
(74) Attorney, Agent, or Firm—Brian Roffe

(57) ABSTRACT

A smart airbag system including a sensor mechanism for controlling the deployment of an occupant protection apparatus in a motor vehicle, such as a gas-inflatable airbag, to protect an occupant of the vehicle in a crash. The system includes a sensor mounted to the vehicle for sensing accelerations of the vehicle and producing an analog signal representative thereof; an electronic converter for receiving the analog signal from the sensor and for converting the analog signal into a digital signal, and a processor which receives the digital signal. The processor includes a pattern recognition system and produces a deployment control signal to a gas control module which controls the flow of gas into or out of the airbag to optimize the injury protection capability of the airbag. The system also accepts inputs from occupant position, velocity and weight sensors and/or anticipatory crash sensors, when such are available, and may affect the deployment control signal based on these inputs.

24 Claims, 10 Drawing Sheets

U.S. PATENT DOCUMENTS

| | | | |
|---|---|---|---|
| 5,508,918 A | | 4/1996 | Gioutsos ........................ 701/45 |
| 5,508,920 A | | 4/1996 | Gioutsos et al. ............... 701/45 |
| 5,519,613 A | * | 5/1996 | Gioutsos et al. ............... 701/45 |
| 5,528,698 A | | 6/1996 | Kamei et al. ................. 382/100 |
| 5,530,649 A | | 6/1996 | Fujishima ..................... 701/45 |
| 5,541,590 A | | 7/1996 | Nishio ......................... 340/903 |
| 5,541,842 A | | 7/1996 | Gioutsos et al. ............... 701/45 |
| 5,546,307 A | | 8/1996 | Mazur et al. ................... 701/45 |
| 5,559,699 A | | 9/1996 | Gioutsos ........................ 701/45 |
| 5,583,771 A | * | 12/1996 | Lynch et al. ................... 701/36 |
| 5,624,132 A | | 4/1997 | Blackburn et al. ........... 280/735 |
| 5,639,117 A | * | 6/1997 | Mandzy et al. .............. 102/530 |
| 5,684,701 A | | 11/1997 | Breed ........................... 701/45 |
| 5,720,519 A | * | 2/1998 | Barnes ........................ 280/735 |
| 5,732,375 A | * | 3/1998 | Cashler ........................ 701/45 |
| 5,749,059 A | * | 5/1998 | Walton ......................... 701/45 |
| 5,758,301 A | | 5/1998 | Saito et al. .................... 701/45 |
| 5,772,238 A | * | 6/1998 | Breed et al. ................. 280/738 |
| 5,801,619 A | * | 9/1998 | Liu et al. ....................... 701/45 |
| 5,809,451 A | * | 9/1998 | Parsons et al. ................ 701/45 |
| 5,821,633 A | * | 10/1998 | Burke et al. ................ 307/10.1 |
| 6,249,729 B1 | * | 6/2001 | Corrado et al. .............. 180/272 |
| 6,254,129 B1 | * | 7/2001 | Rink et al. ................... 280/735 |

OTHER PUBLICATIONS

Breed, D.S., Sanders, W.T. and Castelli, V. "A Complete Frontal Crash Sensor System—I", Society of Automotive Engineers Paper SAE 930650, 1993.

Breed, D.S., Castelli, V. "Trends in Sensing Frontal Impact", Society of Automotive Engineers Paper SAE 890750, 1989.

Breed, D.S. and Castelli, V. "Problems in Design and Engineering of Air Bag Systems", Society of Automotive Engineers Paper SAE 880724, 1988.

Breed, D.S., Sanders, W.T. and Castelli, V., "A Complete Frontal Crash Sensor System —II", Proceedings Enhanced Safety of Vehicles Conference, Munich, 1994, Published by the US Department of Transportation, National Highway Traffic Safety Administration, National Highway Traffic Safety Administration, Washington, D.C.

"Using a Neural Network to Distinguish Between Deployment Events and Non–Deployment Events in a Supplemental Inflatable Restraint System", Dr. Stephen J. Kiselewich and Douglas D. Turner, Delco Electronics Corporation, "Automotive Electronics 95, A review of technical achievements at Delco Electronics", pp. 5–10, 1995.

* cited by examiner

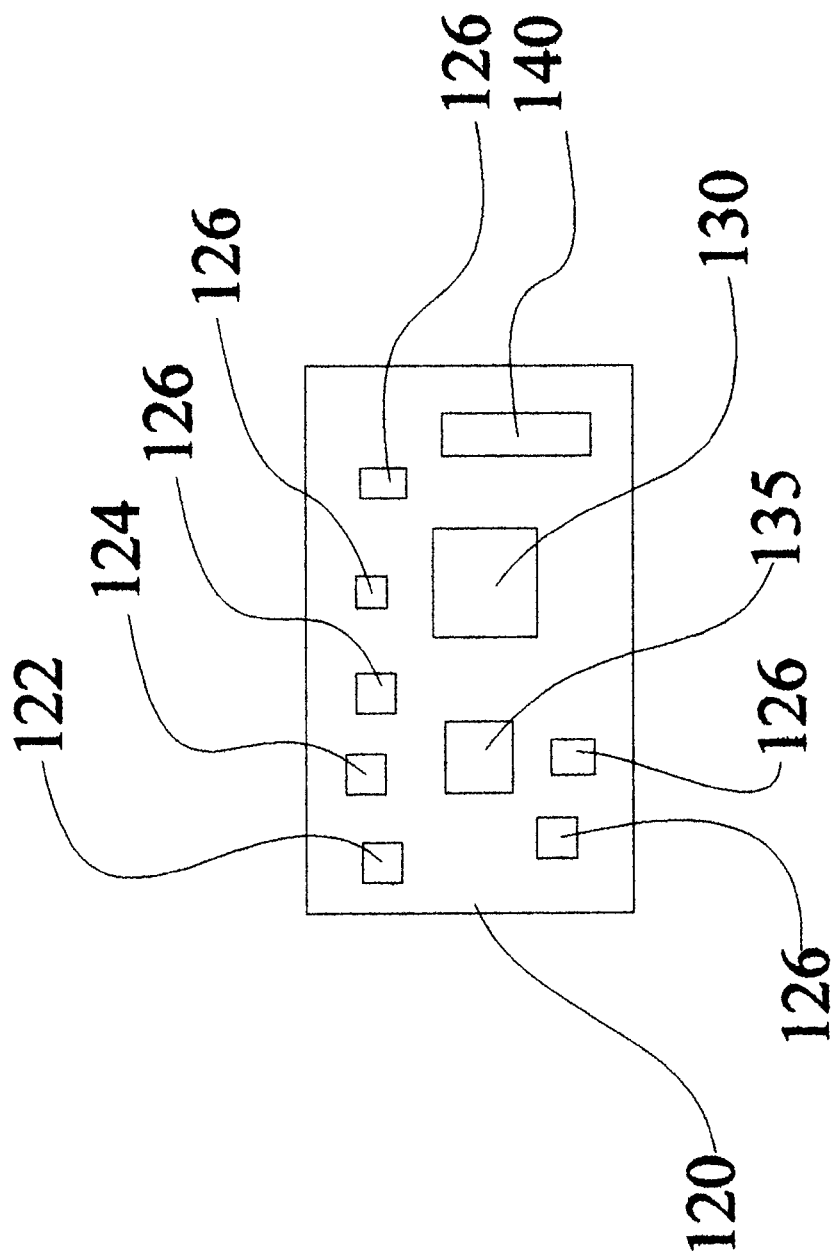

NEURAL NETWORK SINGLE POINT, PASSENGER COMPARTMENT MOUNTED SENSOR PERFORMANCE

| SCALED VELOCITY | BARRIER SCALING FACTOR | | | | | | |
|---|---|---|---|---|---|---|---|
| | 1 | 1.2 | 1.4 | 1.6 | 1.8 | 2 | |
| 8 MPH | NT | NT | NT | NT | NT | NT | |
| 10 MPH | NT | 0.7/2.9 | NT | 1.0/3.0 | NT | NT | |
| 12 MPH | 0.0/1.1 | 0.8/3.5 | 0.9/3.5 | 1.0/3.4 | 1.4/3.9 | 2.0/4.7 | |
| 14 MPH | 0.0/1.2 | 0.9/4.1 | 1.0/3.8 | 1.2/4.0 | 1.3/4.0 | 1.7/4.5 | |
| 16 MPH | 0.0/1.4 | 0.9/4.4 | 1.0/4.0 | 1.1/4.0 | 1.4/4.3 | 1.7/4.6 | |
| 18 MPH | 0.0/1.6 | 0.8/4.2 | 0.7/3.6 | 1.2/4.5 | 1.6/4.8 | 1.8/4.9 | |
| 20 MPH | 0.0/1.8 | 0.7/4.3 | 0.7/4.0 | 1.1/4.3 | 1.3/4.4 | 1.0/3.8 | |
| 22 MPH | 0.0/1.9 | 0.5/3.9 | 0.7/4.0 | 0.9/4.1 | 1.2/4.6 | 1.1/4.2 | |
| 24 MPH | 0.0/2.1 | 0.1/2.3 | 0.8/4.4 | 0.8/4.2 | 1.3/5.0 | 1.4/4.8 | |
| 26 MPH | 0.0/2.3 | 0.1/2.5 | 0.5/4.0 | 0.9/4.5 | 1.0/4.4 | 1.2/4.6 | |
| 28 MPH | 0.0/2.5 | 0.0/2.1 | 0.1/2.4 | 0.7/4.2 | 0.8/4.1 | 0.5/3.2 | |
| 30 MPH | 0.0/2.7 | 0.0/2.3 | 0.1/2.6 | 0.1/2.3 | 0.8/4.4 | 1.2/5.0 | |
| 32 MPH | 0.0/2.8 | 0.0/2.4 | 0.1/2.8 | 0.1/2.5 | 0.9/4.7 | 1.1/4.9 | |
| 34 MPH | 0.0/3.0 | 0.0/2.3 | 0.0/2.0 | 0.0/1.8 | 0.6/4.2 | 1.2/5.3 | |

Fig. 8

OPTIMIZED SINGLE POINT, PASSENGER COMPARTMENT MOUNTED SENSOR PERFORMANCE

| SCALED VELOCITY | BARRIER SCALING FACTOR | | | | | |
|---|---|---|---|---|---|---|
| | 1 | 1.2 | 1.4 | 1.6 | 1.8 | 2 |
| 8 MPH | NT | NT | NT | NT | NT | NT |
| 10 MPH | 4.7/10.3* | NT | NT | NT | NT | NT |
| 12 MPH | 2.2/6.7 | 5.8/12.1 | NT | NT | NT | NT |
| 14 MPH | 2.2/7.2 | 2.7/7.5 | 3.9/8.9 | NT | NT | NT |
| 16 MPH | 2.2/7.6 | 2.7/7.9 | 3.4/8.5 | 4.2/9.3 | NT | NT |
| 18 MPH | 2.2/8.0 | 2.8/8.7 | 3.6/9.2 | 4.2/9.7 | 5.0/10.5 | 17.8/27.5 |
| 20 MPH | 2.0/7.9 | 3.1/9.3 | 3.7/9.7 | 4.3/11.2 | 5.0/10.9 | 5.9/11.7 |
| 22 MPH | 1.0/5.3 | 2.7/8.9 | 3.9/10.4 | 4.5/10.9 | 5.2/11.5 | 5.9/12.2 |
| 24 MPH | .5/4.2 | 1.6/6.5 | 3.9/10.8 | 4.8/11.6 | 5.4/12.0 | 6.1/12.8 |
| 26 MPH | .4/4 | 1.2/5.7 | 2.0/6.8 | 4.5/11.5 | 5.8/13 | 6.4/13.5 |
| 28 MPH | .4/4.1 | .6/4.0 | 1.8/6.6 | 2.7/7.8 | 5.9/13.5 | 6.8/14.4 |
| 30 MPH | .4/4.2 | .5/4.0 | .8/4.2 | 2.2/6.9 | 6.4/14.5 | 7.1/15.1 |
| 32 MPH | .3/4.2 | .5/4.1 | .7/7.2 | 2.1/7.0 | 2.6/7.4 | 3.4/8.4 |
| 34 MPH | .3/4.0 | .5/4.2 | .7/4.3 | .9/4.5 | 2.6/7.5 | 4.0/9.6 |

*Fig. 9*

SMART AIRBAG SYSTEM

BACKGROUND OF THE INVENTION

Pattern recognition techniques, such as artificial neural networks are finding increased application in solving a variety of problems such as optical character recognition, voice recognition, and military target identification. In the automotive industry in particular, pattern recognition techniques have now been applied to identify various objects within the passenger compartment of the vehicle, such as a rear facing child seat, as well as to identify threatening objects with respect to the vehicle, such as an approaching vehicle about to impact the side of the vehicle. In this regard, reference is made, for example, to copending U.S. patent application Ser. No. 08/239,978 filed May 9, 1994, now abandoned, Ser. No. 08/247,760 filed May 23, 1994, now abandoned and Ser. No. 08/798,029 filed Feb. 6, 1997, now abandoned which are entirely incorporated herein by reference. Pattern recognition techniques have also been applied to sense automobile crashes for the purpose of determining whether or not to deploy an airbag or other passive restraint, or to tighten the seatbelts, cutoff the fuel system, or unlock the doors after the crash. In this regard, reference is made, for example, to copending U.S. patent application Ser. No. 08/476,076 filed Jun. 7, 1995, now U.S. Pat. No. 5,684,701 which is entirely incorporated herein by reference. Heretofore, pattern recognition techniques have not been applied to forecast the severity of automobile crashes for the purpose of controlling the flow of gas into or out of an airbag to tailor the airbag inflation characteristics or to control seatbelt retractors, pretensioners or energy dissipators to the crash severity. Furthermore, such techniques have also not been used for the purpose of controlling the flow of gas into or out of an airbag to tailor the airbag inflation characteristics to the size, position or relative velocity of the occupant or other factors such as seatbelt usage, seat and seat back positions, headrest position, vehicle velocity, etc.

"Pattern recognition" as used herein means any system which processes a signal that is generated by an object, or is modified by interacting with an object, in order to determine which one of a set of classes the object belongs to. In this case, the object can be a vehicle with an accelerometer which generates a signal based on the deceleration of the vehicle. Such a system might determine only that the object is or is not a member of one specified class. (e.g., airbag required crashes), or it might attempt to assign the object to one of a larger set of specified classes, or find that it is not a member of any of the classes in the set. One such class might consist of vehicles undergoing a crash of a certain severity into a pole. The signals processed are generally electrical signals coming from transducers which are sensitive to either acceleration, or acoustic or electromagnetic radiation and, if electromagnetic, they can be either visible light, infrared, ultraviolet or radar.

To "identify" as used herein means to determine that the object belongs to a particular set or class. The class may be one containing all frontal impact airbag-desired crashes into a pole at 20 mph, one containing all events where the airbag is not required, or one containing all events requiring a triggering of both stages of a dual stage gas generator with a 15 millisecond delay between the triggering of the first and second stages.

All electronic crash sensors currently used in sensing frontal impacts include accelerometers which detect and measure the vehicle accelerations during the crash. The accelerometer produces an analog signal proportional to the acceleration experienced by the accelerometer and hence the vehicle on which it is mounted. An analog to digital converter (ADC) transforms this analog signal into a digital time series. Crash sensor designers study this digital acceleration data and derive therefrom computer algorithms which determine whether the acceleration data from a particular crash event warrants deployment of the airbag. This is usually a trial and error process wherein the engineer or crash sensor designer observes data from crashes where the airbag is desired and when it is not needed, and other events where the airbag is not needed. Finally, the engineer or crash sensor designer settles on the "rules" for controlling deployment of the airbag which are programmed into an algorithm which seem to satisfy the requirements of the crash library, i.e., the crash data accumulated from numerous crashes and other events. The resulting algorithm is not universal and most such engineers or crash sensor designers will answer in the negative when asked whether their algorithm will work for all vehicles. Such an algorithm also merely determines that the airbag should or should not be triggered. Heretofore, no attempt has been made to ascertain or forecast the eventual severity of the crash or, more specifically, the velocity change versus time of the passenger compartment during the crash from the acceleration data obtained from the accelerometer.

Several papers have been published pointing out some of the problems and limitations of electronic crash sensors which are mounted out of the.crush zone of the vehicle, usually in a protected location in the passenger compartment of the vehicle. The crush zone is defined, for the purposes herein, as that portion of the vehicle which has crushed at the time that the crash sensor must trigger deployment of the restraint system. These sensors are frequently called single point crash sensors. Technical papers which discuss the limitations of current single point sensors along with discussions of the theory of crash sensing, which are relevant to this invention and which are included entirely herein by reference, are:

1) Breed, D. S. and Castelli, V. "Problems in Design and Engineering of Air Bag Systems", Society of Automotive Engineers Paper SAE 880724, 1988
2) Breed, D. S., Castelli, V. "Trends in Sensing Frontal Impact", Society of Automotive Engineers Paper SAE 890750, 1989.
3) Breed, D. S., Sanders, W. T. and Castelli, V. "A Critique of Single Point Crash Sensing", Society of Automotive Engineers Paper SAE 920124, 1992.
4) Breed, D. S., Sanders, W. T. and Castelli, V. "A Complete Frontal Crash Sensor System—I", Society of Automotive Engineers Paper SAE 930650, 1993.
5) Breed, D. S. and Sanders, W. T. "Using Vehicle Deformation to Sense Crashes", Presented at the International Body and Engineering Conference, Detroit Mich., 1993.
6) Breed, D. S., Sanders, W. T. and Castelli, V., "A Complete Frontal Crash Sensor System—II", Proceedings Enhanced Safety of Vehicles Conference, Munich, 1994, Published by the US Department of Transportation, National Highway Traffic Safety Administration, Washington, D.C.

These papers demonstrate, among other things, that there is no known theory which allows an engineer to develop an algorithm for sensing crashes and selectively deploying the airbag except when the sensor is located in the crush zone of the vehicle. These papers show that, in general, there is insufficient information within the acceleration signal measured in the passenger compartment to sense all crashes. Another conclusion suggested by these technical papers is that if an algorithm can be found which works for one vehicle, it will also work for all vehicles since it is possible to create any crash pulse measured in one vehicle, in any vehicle. Note in particular SAE paper 920124 referenced above.

In spite of, the problems associated with finding the optimum crash sensor algorithm, many vehicles on the road today have electronic single point crash sensors. Some of the problems associated with single point sensors have the result that an out-of-position occupant who is sufficiently close to the airbag at the time of deployment will be injured or killed by the deployment itself. Fortunately, systems are now being developed which monitor the location of occupants within the vehicle and can suppress deployment of the airbag if the occupant is more likely to be injured by the deployment than by the accident. These systems do not, however, currently provide the information necessary for the control of airbag systems, or the combination of seatbelt and airbag systems, which have the capability of varying the flow of gas into or out of the airbag and thus to tailor the airbag to the size and weight of the occupant (or possibly another morphological characteristic of the occupant), as well as to the position, velocity and seatbelt use of the occupant. More particularly, no such system exists which uses pattern recognition techniques to match the airbag deployment or gas discharge from the airbag to the severity of the crash or the size, weight, position, velocity and seatbelt use of an occupant.

Since there is insufficient information in the acceleration data, as measured in the passenger compartment, to sense all crashes and since some of the failure modes of published single point sensor algorithms can be easily demonstrated using the techniques of crash and velocity scaling described in the above-referenced technical papers, and moreover since the process by which engineers develop algorithms is based on trial and error, pattern recognition techniques such as neural network should be able to be used to create an algorithm based on training the system on a large number of crash and non-crash events which, although not perfect, will be superior to all others. This in fact has proved to be true and is the subject the invention disclosed in copending U.S. patent application Ser. No. 08/476,076, now U.S. Pat. No. 5,684,701 referenced above. That invention is based on the ability of neural networks to forecast, based on the first part of the crash pulse, that the crash will be of a severity which requires that an airbag be deployed. As will be discussed in greater detail below, an improvement on that invention, which is the subject of the instant invention, carries this process further by using a neural network pattern recognition system to forecast the velocity change of the crash over time so that the inflation and/or deflation of the airbag, and the seatbelt, can be optimized. This invention further contemplates the addition of the pattern recognition occupant position and velocity determination means disclosed in copending patent applications Ser. Nos. 08/239,978, 08/247,760 and 08/798,029 also referenced above. Finally, the addition of the weight of the occupant is contemplated to provide a measure of the occupants inertia or momentum as an input to the system. The combination of these systems in various forms can be called "smart airbags" or "smart restraints" which will be used as equivalents herein. In a preferred implementation, the crash severity is not explicitly forecasted but rather, the value of a control parameter used to control the flows of inflator gas in or out of the airbag is forecasted.

Smart airbags can take several forms which can be roughly categorized into four evolutionary stages, which will hereinafter be referred to as Phase 1 (2,3,4) Smart Airbags, as follows:

1) Occupant sensors such as the disclosed in the U.S. patent applications cross-referenced above use various technologies to turn off the airbag where there is a rear facing child seat present or if either the driver or passenger is out-of-position to where he/she is more likely to be injured by the airbag than from the accident.

2) Occupant sensors will be used along with variable inflation or deflation rate airbags to adjust the inflation/deflation rate to match the occupant first as to his/her position and then to his/her morphology. The occupant sensors disclosed in the cross-referenced patent applications will also handle this with the possible addition of an occupant weighing system. One particular weight measuring system which makes use of strain gages mounted onto the seat supporting structure is disclosed in copending U.S. patent application Ser. No. 08/474,784 filed Jun. 7, 1995, now U.S. Pat. No. 5,748,473 which is included entirely herein by reference. At the end of this phase, little more can be done with occupant measurement or characterization systems.

3) The next improvement, and the subject of the instant invention, is to use a pattern recognition system such as neural networks as the basis of a crash sensor not only to determine if the airbag should be deployed but also to predict the crash severity from the pattern of the initial portion of the crash pulse. Additionally, the crash pulse will continue to be monitored even after the decision has been made to deploy the airbag to see if the initial assumption of the crash type based on the pattern up to the deployment decision was correct. If the pattern changes indicating a different crash type, the flow rate to the airbag can be altered on the fly, i.e., substantially instantaneously.

4) Finally, anticipatory sensing using pattern recognition techniques such as neural networks will be used to identify the crash before it takes place and select the deployment characteristics of the airbag to match the anticipated crash with the occupant size and position. Such an anticipatory sensor is described in copending U.S. patent application Ser. No. 08/247,760 filed May 23, 1994.

Any of these phases can be combined with various methods of controlling the pretensioning, retraction or energy dissipation characteristics of the seatbelt. Although the main focus of this invention is the control of the flows of gas into and out of the airbag, it is to be recognized that control of the seatbelt can also benefit from this invention and that the condition of the seatbelt can be valuable input information into the pattern recognition system.

When a crash commences, the vehicle starts decelerating and an accelerometer located in the passenger compartment begins sensing this deceleration and produces an electronic signal which varies over time in proportion to the magnitude of the deceleration. This signal contains information as to the type of the crash which can be used to identify the crash. A crash into a pole gives a different signal than a crash into a rigid barrier, for example, even during the early portion of the crash before the airbag triggering decision has been made. A neural network pattern recognition system can be trained to recognize and identify the crash type from this early signal and further to forecast ahead the velocity change versus time of the crash. Once this forecast is made, the severity and timing of the crash can be predicted. Thus, for a rigid barrier impact, an estimate of the eventual velocity change of the crash can be made and the amount of gas needed in the airbag to cushion an occupant as well as the time available to get that amount of gas into the airbag can be determined and used to control the airbag inflation.

Taking another example, that of a crash into a highway energy absorbing crash cushion. In this case, the neural-network-based sensor determines that this is a very slow crash and causes the airbag to inflate.more slowly thereby reducing the incidence of collateral injuries such as broken arms and eye lacerations.

In both of these cases, the entire decision making process takes place before the airbag deployment is initiated. In another situation where a soft crash is preceded by a hard crash, such as might happen if a pole were in front of a barrier, the neutral network system would first identify the soft pole crash and begin slowly inflating the airbag. However, once the barrier impact began, the system would recognize that the crash type has changed and recalculate the amount and timing of the introduction of gas into the airbag and send appropriate commands to the inflation control system of the airbag to possibly vary the introduction of gas into the airbag.

There are many ways of controlling the inflation of the airbag and several are now under development by the inflator companies. One way is to divide the airbag into different charges and to initiate these charges independently as a function of time to control the airbag inflation. An alternative is to always generate the maximum amount of gas but to control the amount going into the airbag, dumping the rest into the atmosphere. A third way is to put all of the gas into the airbag but control the outflow of the gas from the airbag through a variable vent valve. For the purposes herein, all controllable apparatus for varying the gas flow into or out of the airbag over time will be considered as a gas control module whether the decision is made at the time of initial airbag deployment, at one or more discrete times later or continuously during the crash event.

The use of pattern recognition techniques in crash sensors has another significant advantage in that it can share the same pattern recognition hardware and software with other systems in the vehicle. Pattern recognition techniques have proven to be effective in solving other problems related to airbag passive restraints. In particular, the identification of a rear-facing child seat located on the front passenger seat, so that the deployment of the airbag can be suppressed, has been demonstrated. Also, the use of pattern recognition techniques for the classification of vehicles about to impact the side of the subject vehicle for use in anticipatory side impact crash sensing shows great promise. Both of these pattern recognition systems, as well as others under development, can use the same computer system as the crash sensor and prediction system of this invention. Moreover, both of these systems will need to interact with, and should be part of, the diagnostic module used for frontal impacts. It would be desirable for cost and reliability considerations, therefore, for all such systems to use the same computer system. This is particularly desirable since computers designed specially for solving pattern recognition problems, such as neural-computers, are now available and can be integrated into a custom application specific integrated circuit (ASIC).

The smart airbag problem is complex and difficult to solve by ordinary mathematical methods. Looking first at the influence of the crash pulse, the variation of crash pulses in the real world is vast and quite different from the typical crashes run by the automobile industry as reported in the above-referenced technical papers. It is one problem to predict that a crash is of a severity level to require the deployment of an airbag. It is quite a different problem to predict exactly what the velocity versus time function will be and then to adjust the airbag inflation/deflation control system to make sure that just the proper amount of gas is in the airbag at all times even without considering the influence of the occupant. To also simultaneously consider the influence of occupant size, weight, position and velocity renders this problem for all practical purposes unsolvable by conventional methods.

On the other hand, if a pattern recognition system such as a neural network is used and trained on a large variety of crash acceleration segments, as described in U.S. Pat. No. 5,684,701 referenced above, and a setting for the inflation/deflation control system is specified for each segment, then the problem can be solved. Furthermore, inputs from the occupant position and occupant weight sensors can also be included. The result will be a training set for the neural network involving many millions, and perhaps tens of millions, of data sets or vectors as every combination of occupancy characteristics and acceleration segment is considered. Fortunately, the occupancy data can be acquired independently and is currently being done for solving the out-of-position problem of Phase 1 smart airbags. The crash data is available in abundance and more can be created using the crash and velocity scaling techniques described in the above-referenced papers. The training using combinations of the two data sets, which must also take into account occupant motion which is not adequately represented in the occupancy data, can then be done by computer. Even the computer training process is significant to tax current PC capabilities and in some cases the use of a super-computer may be warranted.

SUMMARY OF THE INVENTION

The present invention uses pattern recognition techniques such as a neural network, or neural-network-derived algorithm, to analyze the digitized accelerometer data (also referred to as acceleration data herein) created during a crash and, in some cases, occupant size, position, seatbelt use, weight and velocity data, and, in other cases, data from an anticipatory crash sensor, to determine not only if and when a passive restraint such as an airbag should be deployed but also to control the flow of gas into or out of the airbag. Principal objects and advantages include:

1) To provide a single point sensor including an accelerometer which makes maximum use of the information in the acceleration data to determine not only whether an airbag should be deployed but the rate of deployment as required for Phase 3 Smart Airbags.

2) To provide a single point sensor including an accelerometer which makes maximum use of the information in the acceleration data to determine not only whether an airbag should be deployed but the total amount of gas which should be used to inflate the airbag as required for Phase 3 Smart Airbags.

3) To provide a single point sensor including an accelerometer which makes maximum use of the information in the acceleration data to determines the gas flow control parameter value for use by a gas control module to control the flow of gas into or out of an airbag as required for Phase 3 Smart Airbags.

4) To provide a single computer system which can perform several different pattern recognition functions within an automobile or other vehicle including, for example, crash sensing and severity prediction, anticipatory sensing, identification of an occupant located within the vehicle passenger compartment and determination of the position and velocity of the occupant.

5) To provide a crash sensor and crash severity prediction algorithm which is derived by training using a set of data derived from staged automobile crashes and non-crash events as well as other analytically derived data, as required for Phase 3 Smart Airbags.

6) To provide a crash sensor and crash severity prediction algorithm based on pattern recognition techniques.

7) To provide a crash sensor and crash severity prediction algorithm which uses other data in addition to acceleration data derived from the crash wherein this data is combined with acceleration data and, using pattern recognition techniques, the need for deployment and the rate of deployment of a passive restraint is determined.

8) To provide a crash sensor and crash severity prediction algorithm using data from an anticipatory sensor and an occupant position and velocity sensing system to optimize the deployment of a passive restraint system taking into account the crash severity and occupant dynamics to minimize injuries to the occupant as required for Phase 4 Smart Airbags.

9) To provide an electronic module which combines the functions of crash sensing and crash severity prediction, occupant position and velocity sensing, anticipatory sensing (as required for Phase 4 Smart Airbags) and airbag system diagnostics.

10) To provide a Phase 1, Phase 2, Phase 3 or Phase 4 Smart Airbag system which uses a neural computer.

Other objects and advantages of this invention will become apparent from the disclosure which follows.

Generally, the present invention provides a smart airbag system which optimizes the deployment of an occupant protection apparatus in a motor vehicle, such as an airbag, to protect an occupant of the vehicle in a crash. The system includes an accelerometer mounted to the vehicle for sensing accelerations of the vehicle and producing an analog signal representative thereof; an electronic converter for receiving the analog signal from the sensor and for converting the analog signal into a digital signal, and a processor which receives the digital signal. The processor includes a pattern recognition system and produces a deployment signal when the pattern recognition system determines that the digital signal contains a pattern characteristic of a vehicle crash requiring occupant protection and further produces a signal which controls the flow of inflator gas into or out of the airbag. In some implementations, the system also includes occupant position and velocity sensing means which outputs a signal which is also used by the processor in producing the signal which controls the flow of gas into or out of the airbag.

In one particular embodiment, the sensor system for controlling the deployment of the occupant protection apparatus comprises sensor means mounted on the vehicle for sensing accelerations of the vehicle, e.g., in a position to sense frontal, rear and/or side impacts into the vehicle, and producing an analog signal representative thereof, converting means for receiving the analog signal and converting it into a digital signal, and processing means for receiving and processing the digital signal. The processing means comprise pattern recognition means for determining if the digital signal contains a pattern characteristic of a vehicle crash requiring deployment of the occupant protection apparatus and if so, produce a deployment control signal. The sensor system also includes control means coupled to the processing means and responsive to the deployment control signal for controlling the rate of deployment of the occupant protection apparatus. The pattern recognition means comprises a neural network or a neural computer coupled to the converting means. The converting means may derive the digital signal from the integral of the analog signal. The processing means may also be arranged to detect when the occupant(s) to be protected by the deployable occupant protection apparatus is/are out-of-position and thereupon to suppress deployment of the occupant protection apparatus. In one embodiment, the deployable occupant protection apparatus is a passenger side airbag and the control means control the rate of a flow of inflation fluid into the passenger side airbag, the processing means also being optionally designed to detect the presence of a rear-facing child seat positioned on the passenger seat and thereupon to suppress deployment of the passenger side airbag. The sensor means may comprise an anticipatory sensor or possibly a sensor for a collision avoidance system or possibly an acceleration measurement system which measures accelerations in at least two directions.

In an enhanced embodiment, the system includes detecting means for detecting the position, size, velocity, and/or weight of the occupant to be protected by the deployable occupant protection apparatus. The detecting means are designed to affect the control means in order to adjust the deployment rate of the occupant protection apparatus depending on the detected position, size, velocity, and/or weight of the occupant.

If the processing means comprises a neural computer, additional data may be input thereto to be used by the pattern recognition means, e.g., data from an anticipatory sensor or data from a collision avoidance sensor. The neural computer can also diagnoses the apparatus readiness.

The method for obtaining an algorithm for use with a computer-based crash sensor to control the deployment rate of a deployable occupant protection device in a vehicle in a vehicle crash in accordance with the invention comprises the steps of:

(a) obtaining digital crash data representative of the vehicle for which the crash sensor is intended to be used, the crash data being obtained from deployment desired crashes, crashes in which deployment is not desired and other events, the combination of all such crashes and events constituting a crash library for the vehicle;

(b) designing a candidate pattern recognition algorithm;

(c) training the pattern recognition algorithm to produce an output to control the inflation or deflation rate of the deployable occupant protection system for the events of the crash library using a pattern recognition computer program and the crash library until the control output errors are reduced to a minimum, resulting in a trained neural network;

(d) testing the trained pattern recognition algorithm using additional crashes and events representative of the vehicle;

(e) optionally redesigning the pattern recognition algorithm when testing performance is unsatisfactory, and repeating training and testing steps(c) and (d); and (f) outputting from the pattern recognition program the resulting crash sensor and inflation control algorithm.

The method for sensing a crash of a vehicle to determine the deployment rate of a deployable occupant protection device in the vehicle in accordance with the invention comprises the steps of:

(a) obtaining an acceleration signal from an accelerometer mounted on the vehicle;

(b) converting the acceleration signal into a digital time series;

(c) entering the digital time series data into a first series of input nodes of a neural network;

(d) performing a mathematical operation on the data from each of the first series of input nodes and inputting the operated-on data into a second series of nodes wherein the operation performed on the data from each of the first series of input node prior to inputting the operated-on data to the second series node is different from the operation performed on the data from the others of the first series of input nodes;

(e) combining the operated-on data from all of the input nodes into each second series node to form a value at each second series node;

(f) performing a mathematical operation on each of the values on the second series of nodes and inputting the operated-on data into an output series of nodes wherein the operation performed on each of the second series node data prior to inputting the operated-on value to an output series node is different from that operation performed on some other second series node data;

(g) combining the operated-on data from all of the second series nodes into each output series node to form a value at each output series node; and, (h) outputting a value to an gas flow control module from the output node to control the rate of deployment of a deployable device.

Optionally, a third series of nodes is placed between the second series of nodes and the output series of nodes and the operated-on data from the second series of nodes is input into the third series of nodes and operated on values from the third series of nodes is input into the output nodes.

BRIEF DESCRIPTION OF THE DRAWINGS

The following drawings are illustrative of embodiments of the invention and are not meant to limit the scope of the invention as encompassed by the claims.

FIG. 1A is an enlarged view of the sensor and diagnostic module shown in FIG. 1.

FIG. 8 contains the results of a neural network algorithm on a crash matrix created using the techniques of velocity and crash scaling.

FIG. 9 contains the results of a standard single point crash sensor on a crash matrix created using the techniques of velocity and crash scaling.

DETAILED DESCRIPTION OF THE PREFERRED EMBODIMENTS

Figure 1:
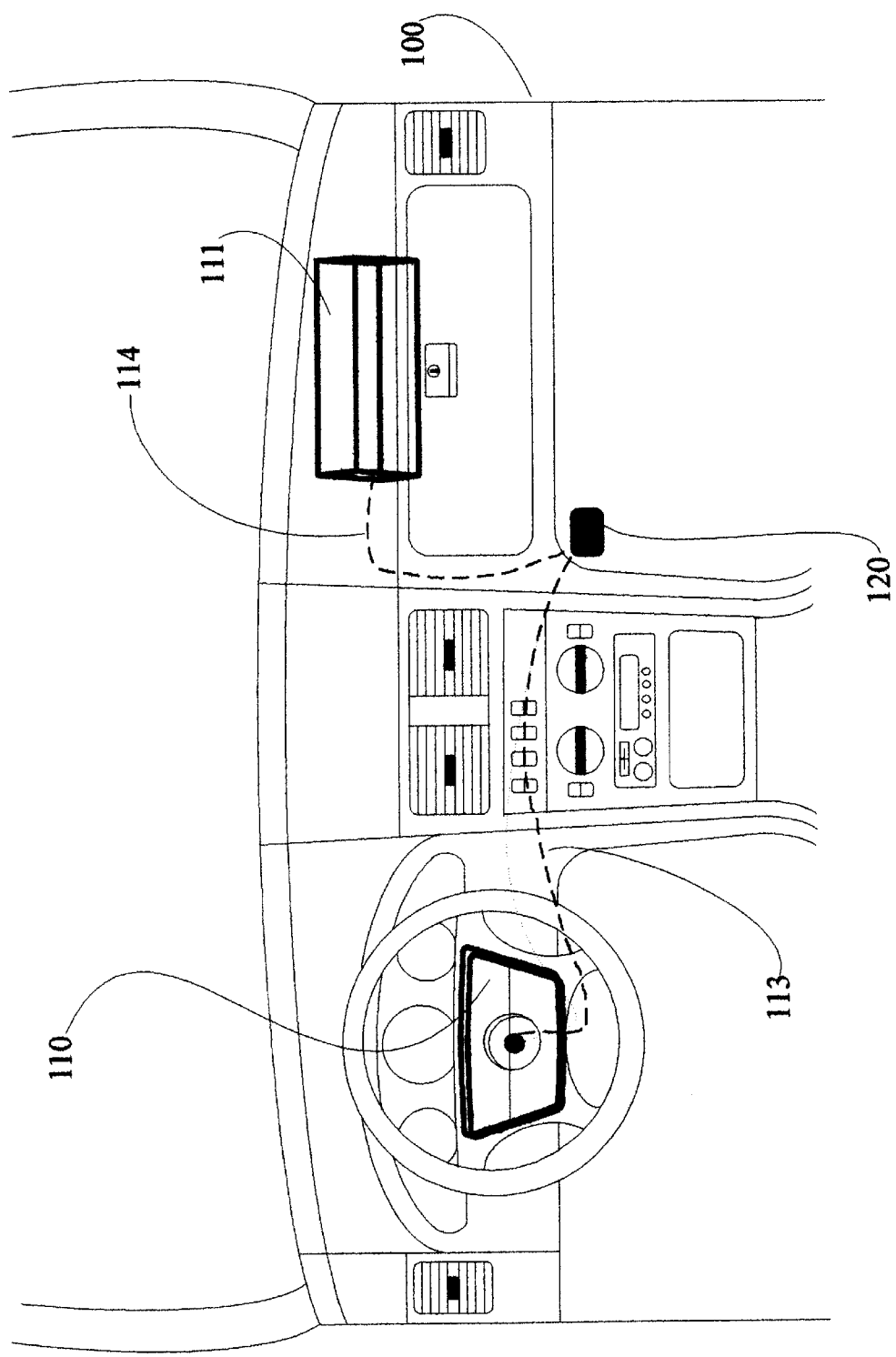
FIG. 1 is a view of the front of the passenger compartment of a motor vehicle, with portions cut away and removed, having dual airbags and a single point crash sensor and crash severity forecaster including an accelerometer and using a pattern recognition technique.

Referring to the accompanying drawings wherein like reference numerals refer to the same or similar elements, the airbag electronic sensor and diagnostic module (SDM) is typically mounted at a convenient location in the passenger compartment such as the transmission tunnel or firewall. FIG. 1 is a view of the front of a passenger compartment 100 of an automobile with portions cut away and removed, having dual airbags 110, 111 and an SDM 120 containing a single point crash sensor and crash forecasting algorithm, (hereinafter this combination will be referred to as a crash sensor) comprising a tri-axial accelerometer 122, an analog to digital converter 124 and a pattern recognition algorithm contained within a microprocessor 130, all of which may be mounted on a single circuit board and electrically coupled to one another. Alternately, the microprocessor 130 can be a neural computer. A tri-axial accelerometer is a device which includes three accelerometers and measures accelerations in three orthogonal directions which are typically the longitudinal, lateral and vertical directions. The circuit board of the SDM 120 also optionally contains a capacitor 140 as a backup power supply, other electronic components 126 and various circuitry. The SDM is connected to the airbags 110,111 with wires 113 and 114. In this embodiment, the pattern recognition technique used is a neural network which analyzes data from one, two or three accelerometers to determine whether the vehicle is experiencing a crash from any direction. If the neural network determines, e.g., by analysis of a pattern in the signal emanating from the accelerometer, that the accident merits deployment of a restraint system, such as a frontal or side airbag, or a movable headrest, it initiates such deployment and thus constitutes in this regard airbag deployment initiation means. It also determines the settings for an airbag inflation/deflation control module which determines how much gas is to be generated, how fast it is to be generated, how much should be fed into the airbag, how much should be dumped to the atmosphere and/or how much should be permitted to exhaust from the airbag. The particular method and apparatus for controlling the flows of gas into and out of the airbag will depend on the particular system design. The controller for any such system will hereinafter be referred to as the gas control module and is illustrated in FIG. 1 schematically as 135.

For frontal impacts, for example, a signal is sent through wires 113 and 114 to initiate deployment of airbags 110 and 111 and to control the gas flow into or out of each airbag through the gas control modules (not shown) for each airbag. The analog to digital converter 124 is connected to the acceleration sensor, in this case the tri-axial accelerometer, and converts an analog signal generated by one or more of the accelerometers representative of the acceleration thereof, and thus the vehicle, into a digital signal. In one embodiment, the converter 124 derives the digital signal from the integral of the analog signal. Naturally, many of the components of the printed circuit board can be incorporated into an Application Specific Integrated Circuit (ASIC) as is obvious to those skilled in the art.

The tri-axial accelerometer is mounted by suitable mounting means to the vehicle and can be mounted in a variety of positions to sense, e.g., frontal impacts, side impacts or rear impacts. In another embodiment described below, the microprocessor 130 may include detection means for detecting when the occupant to be protected by the deployable occupant protection apparatus in accordance with the invention is out-of-position and thereupon to suppress deployment of the airbag. Also, the detection means may be applied to detect the presence of a rear-facing child seat positioned on a passenger seat and thereupon to suppress deployment of the airbag. In each case, the microprocessor or neural computer 130 performs an analysis on signals received from appropriate sensors and corresponding ADCs (analog to digital converters).

Throughout much of the discussion herein, the neural network will be used as an example of a pattern recognition technique or algorithm since the neural network is the most developed of such techniques. However, it has limitations which are now being addressed with the development of newer pattern recognition techniques as well as better neural network techniques. These limitations involve the difficulty in describing the process which is used in classifying patterns with the result that there is a fear that a pattern which was not part of the training set might be missed. Also, the training process of the neural network does not guarantee that convergence to the best solution will result. This is known as the local minimum problem wherein the training algorithm converges on a result which is not the best overall solution. These problems are being solved with the development of newer pattern recognition techniques such as disclosed in various U.S. Patents and technical papers. The invention disclosed herein is the use of pattern recognition techniques including neural networks, regardless of the particular technique, to provide a superior smart airbag system. In particular, genetic algorithms are being applied to aid in choosing the best of many possible choices for the neural network architecture. The use of genetic algorithms helps avoid the local minimum situation mentioned above since several different architectures are tried and the best retained.

The pattern recognition crash sensor described and illustrated in FIG. 1 is capable of using information from three accelerometers, each measuring acceleration from an orthogonal direction. As will be described in more detail below, other information can also be considered by the pattern recognition algorithm such as the position of the occupants (also to be discussed below), noise, data from anticipatory acoustic, radar, infrared or other electromagnetic sensors, seat position sensors, seatbelt sensors, speed sensors, or any other information present in the vehicle which is relevant. Since the pattern recognition algorithm is trained on data from real crashes and non-crash events, it can handle data from many different information sources and sort out what patterns correspond to airbag-required events in a way which is nearly impossible for an engineer to do. For this reason, a crash sensor based on neural networks, for example, will always perform better than one devised by engineers. The theory of neural networks including many examples can be found in several books on the subject including: *Techniques And Application Of Neural Networks*, edited by Taylor, M. and Lisboa, P., Ellis Horwood, West Sussex, England, 1993; *Naturally Intelligent Systems*, by Caudill, M. and Butler, C., MIT Press, Cambridge Mass., 1990; and, *Digital Neural Networks*, by Kung, S. Y., PTR Prentice Hall, Englewood Cliffs, N.J., 1993.

Figure 2:
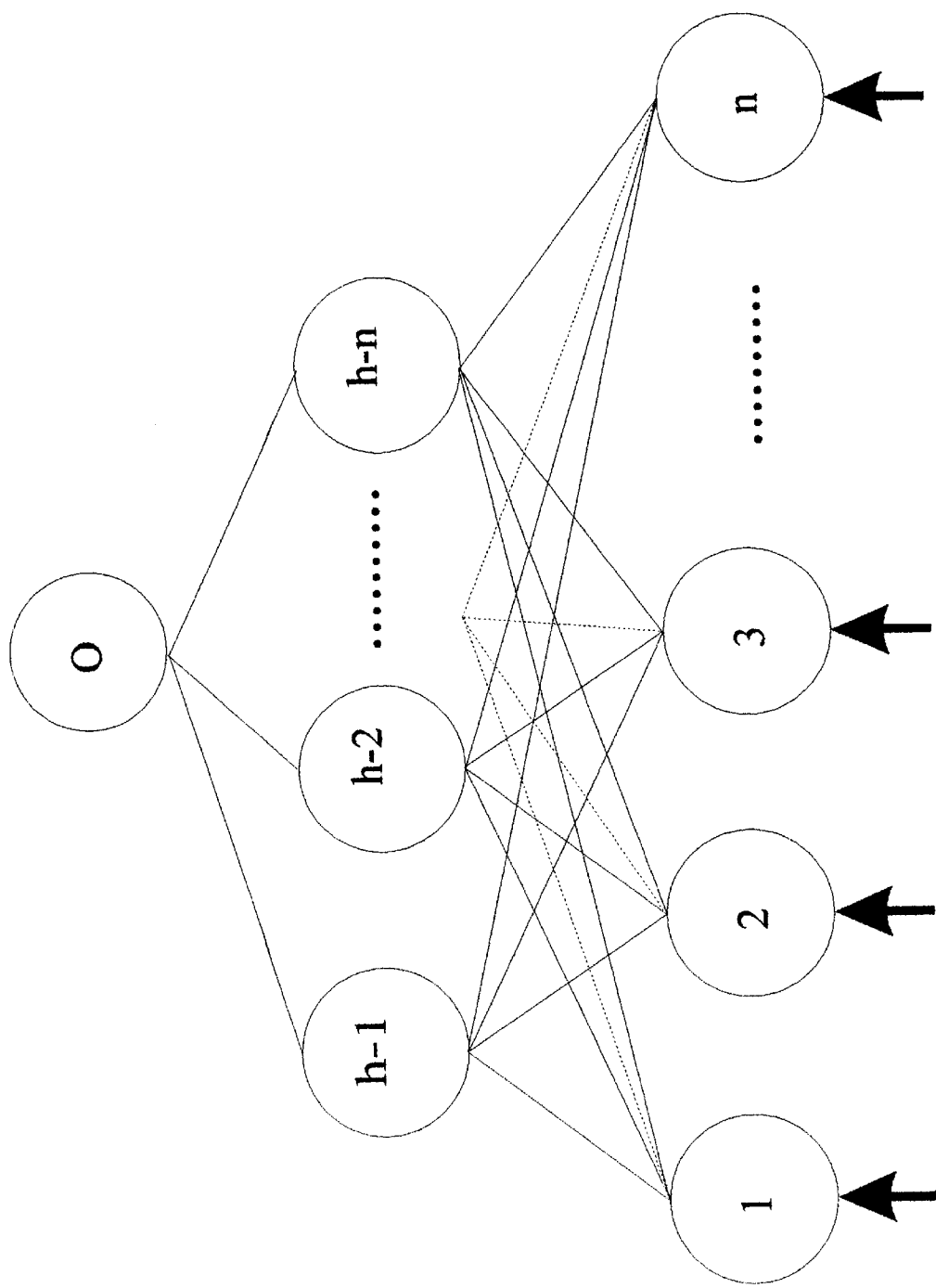
FIG. 2 is a diagram of a neural network used for a crash sensor and crash severity forecaster designed based on the teachings of invention.

A diagram of one example of a neural network used for a crash sensor designed based on the teachings of this invention is shown in FIG. 2. The process can be programmed to begin when an event occurs which indicates an abnormal situation such as the acceleration in the longitudinal direction, for example, exceeding the acceleration of gravity, or it can take place continuously depending on the demands on the computer system. The digital acceleration values from the ADC may be pre-processed, as for example by filtering, and then entered successively into nodes 1, 2, 3, . . . , N and the neural network algorithm compares the pattern of values on nodes 1 through N with patterns for which it has been trained. Each of the input nodes is connected to each of the second layer nodes h-1, . . . ,h-n, called the hidden layer, either electrically as in the case of a neural computer, to be described below, or through mathematical functions containing multiplying coefficients called weights, also described in more detail below. The weights are determined during the training phase while creating the neural network as described in detail in the above text references. At each hidden layer node, a summation occurs of the values from each of the input layer nodes, which have been operated on by functions containing the weights, to create a node value. Similarly, the hidden layer nodes are connected to the output layer nodes, which in this example is only a single node representing the control parameter to be sent to the gas control module. If this value exceeds a certain threshold, the gas control module initiates deployment of the airbag. During the training phase, an output node value is assigned for every setting of the gas control module corresponding to the desired gas flow for that particular crash as it has occurred at a particular point in time. As the crash progresses and more acceleration values appear on the input nodes, the value of the output node may change. In this way, as long as the crash is approximately represented in the training set, the gas flow can be varied at each one or two milliseconds depending on the system design to optimally match the quantity of gas in the airbag to the crash as it is occurring. Similarly, if an occupant sensor and a weight sensor are present, that information can additionally be fed into a set on input nodes so that the gas module can optimize the quantity of gas in the airbag taking into account both the crash deceleration and also the position, velocity, size and weight of the occupant to optimally deploy the airbag to minimize airbag induced injuries and maximize the protection to the occupant. The details of the neural network process and how it is trained are described in above-referenced texts and will not be presented in detail here.

A time step such as two milliseconds is selected as the period in which the ADC pre-processes the output from the accelerometers and feeds data to input node 1. Thus, using this time step, at time equal to 2 milliseconds from the start of the process, node 1 contains a value obtained from the ADC and the remaining input nodes have a random value or a value of 0. At time equal 4 milliseconds, the value which was on node 1 is transferred to node 2 and a new value from the ADC is fed into node 1. In a similar manner, data continues to be fed from the ADC to node 1 and the data on node 1 is transferred to node 2 whose previous value was transferred to node 3 etc. Naturally, the actual transfer of data to different memory locations need not take place but only a redefinition of the location which the neural network should find the data for node 1. For one preferred embodiment of this invention, a total of one hundred input nodes were used representing two hundred milliseconds of acceleration data. At each step, the neural network is evaluated and if the value at the output node exceeds some value such as 0.5 then the airbags are deployed by the remainder of the electronic circuit. In this manner, the system does not need to know when the crash begins, that is, there is no need for a separate sensor to determine the start of the crash or of a particular algorithm operating on the acceleration data to make that determination.

In the example above, one hundred input nodes were used, twelve hidden layer nodes and one output layer node. In this example, accelerations from only the longitudinal direction were considered. If other data such as accelerations from the vertical or lateral directions were also used, then the number of input layer nodes would increase. If the neural network is to be used for sensing rear impacts, or side impacts, 2 or 3 output nodes might be used, one for each gas control module. The theory for determining the complexity of a neural network for a particular application has been the subject of many technical papers and will not be presented in detail here. Determining the requisite complexity for the example presented herein can be accomplished by those skilled in the art of neural network design and is discussed briefly below. In another implementation, the integral of the acceleration data is used and it has been found that the number of input nodes can be significantly reduced in this manner.

The neural network described above defines a method of sensing a crash and determining whether to begin inflating a deployable occupant protection device, and at what rate, and comprises the steps of:

(a) obtaining an acceleration signal from an accelerometer mounted on a vehicle;

(b) converting the acceleration signal into a digital time series which may include pre-processing of the data;

(c) entering the digital time series data into the input nodes of a neural network;

(d) performing a mathematical operation on the data from each of the input nodes and inputting the operated-on data into a second series of nodes wherein the operation performed on each of the input node data prior to inputting the operated on value to a second series node is different from that operation performed on some other input node data;

(e) combining the operated-on data from all of the input nodes into each second series node to form a value at each second series node;

(f) performing a mathematical operation on each of the values on the second series of nodes and inputting the operated-on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) initiating gas flow into an airbag if the value on one output series node is within a selected range signifying that a crash requiring the deployment of an airbag is underway; and (i) causing the amount of gas flow into or out of the airbag to depend on the value on that one output series node.

The particular neural network described and illustrated above contains a single series of hidden layer nodes. In some network designs, more than one hidden layer is used although only rarely will more than two such layers appear. There are of course many other variations of the neural network architecture illustrated above which appear in the literature. For the purposes herein, therefore, "neural network" will be defined as a system wherein the data to be processed is separated into discrete values which are then operated on and combined in at least a two stage process and where the operation performed on the data at each stage is, in general, different for each discrete value and where the operation performed is at least determined through a training process.

The implementation of neural networks can take on at least two forms, an algorithm programmed on a digital microprocessor or in a neural computer. Neural computer chips are now available and neural computers can be incorporated into ASIC designs. As more advanced pattern recognition techniques are developed, especially designed chips can be expected to be developed for these techniques as well.

In the particular implementation described above, the neural network was trained using crash data from approximately 25 crash and non-crash events. In addition, the techniques of velocity and crash scaling, as described in the above-referenced technical papers, were used to create a large library of crashes representing many events not staged by the automobile manufacturer. The resulting library, it is believed, represents the vast majority of crash events which occur in real world accidents for the majority of automobiles. Thus, the neural network algorithm comes close to the goal of a universal electronic single point sensor usable on most if not all automobiles as further described in U.S. Pat. No. 5,684,761. The results of this algorithm as reported in the U.S. Pat. No. 5,684,701 application for a matrix of crashes created by the above mentioned velocity and crash scaling technique appears in FIG. 8. An explanation of the meaning of the numbers in the table can be found in the technical paper titled "Trends In Sensing Frontal Impacts" referenced above. The '076 application illustrates the dramatic improvement achievable through the use of pattern recognition techniques for determining whether the airbag should be deployed. Such a determination is really a forecasting that the eventual velocity change of the vehicle will be above an amount, such as about 12 mph, which requires airbag deployment. The instant invention extends this concept to indirectly predict what the eventual velocity change will in fact be when the occupant represented by an unrestrained mass impacts the airbag. Furthermore, it does so not just at the time that the deployment decision is required but in the preferred implementation at all later times until adding or removing additional gas from the airbag will have no significant injury reducing effect. The neural network could be trained to predict this velocity but even that is not entirely sufficient. What is needed is to determine the flow rate of gas into or out of.the airbag to optimize injury reduction which depends not only on the prediction of the velocity change at a particular point in time but must take into account the prediction that was made at an earlier point when the decision was made to inject a given amount of gas into the airbag. Also, the timing of when the velocity change will occur is a necessary parameter since gas is usually not only flowing into but out of the airbag and both flows must be taken into account. It is thus unlikely that an algorithm, which will perform well in all real world crashes, can be mathematically derived. The neural network solves the problem by considering all of the acceleration up to the current point in the crash and therefore knows how much gas has been put into the airbag and how much has flowed out. It can be seen that even if this problem could be solved mathematically for all crashes, the mathematical approach becomes hopeless as soon as the occupant properties are added.

Once a pattern recognition computer system is implemented in a vehicle, the same system can be used for many other pattern recognition functions such as the airbag system diagnostic. Testing that the pattern of the airbag system during the diagnostic test on vehicle startup, as represented by the proper resistances appearing across the wires to the various system components, for example, is an easy task for a pattern recognition system. The system can thus do all of the functions of the conventional SDM, sensing and diagnostics, as well as many others.

In U.S. patent application Ser. No. 08/239,978 referenced above, the use of neural networks as a preferred pattern recognition technology is disclosed for use in identifying a rear facing child seat located on the front passenger seat of an automobile. This same patent application also discloses many other applications of pattern recognition technologies for use in conjunction with monitoring the interior of an automobile passenger compartment.

Figure 3:
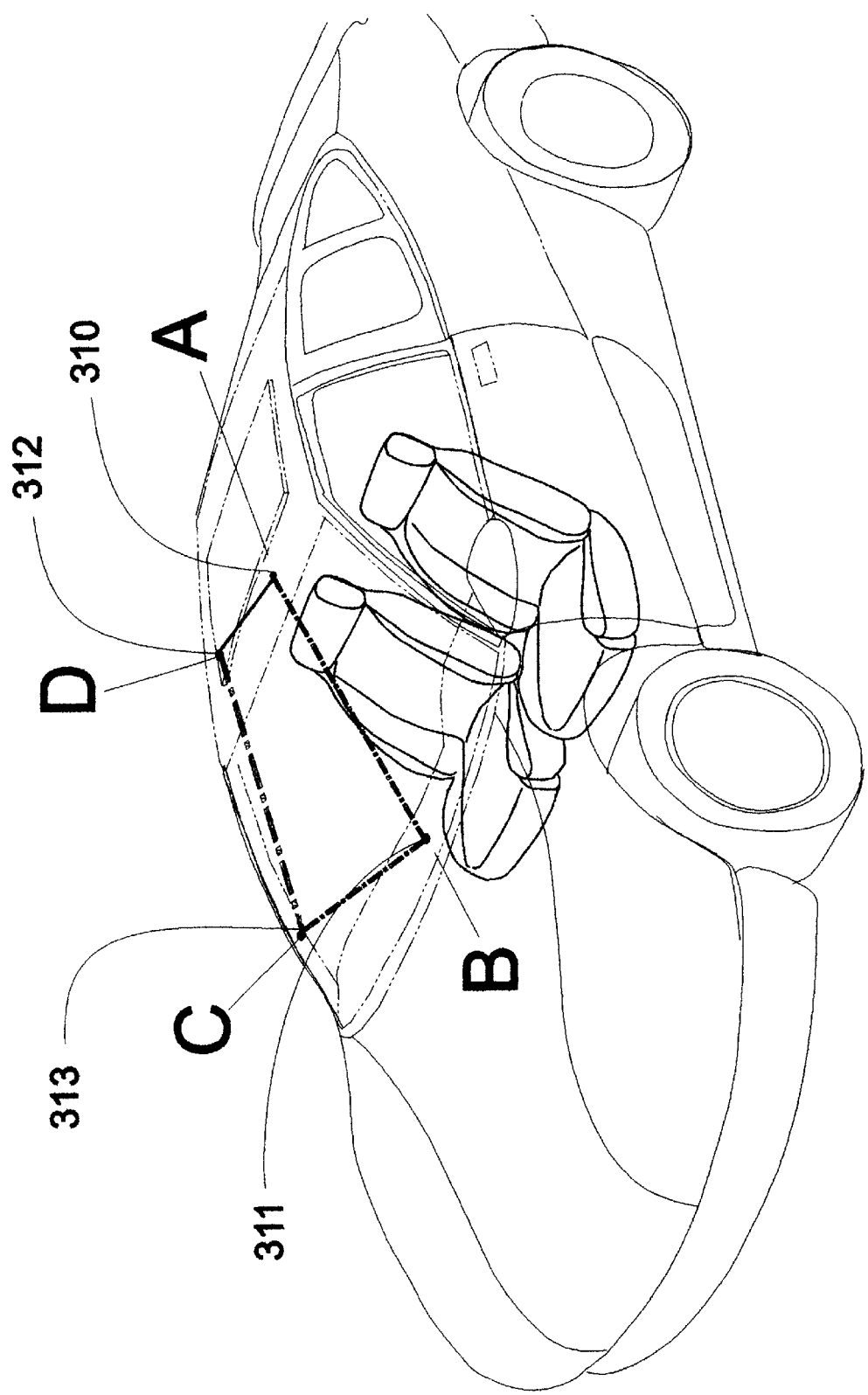
FIG. 3 is a perspective view of a vehicle with the vehicle shown in phantom illustrating one preferred location of the occupant transducers placed according to the methods taught in U.S. patent application Ser. No. 08/798,029.

FIG. 3 illustrates an occupant monitoring system which is capable of identifying the occupancy of a vehicle and measuring the location and velocity of human occupants. This system is disclosed in detail in the '029 application referenced above. In this preferred implementation, four transducers 310, 311, 312 and 313 are used to provide accurate identification and position monitoring of the passenger of the vehicle. Naturally, a similar system can be implemented on the driver side. In FIG. 3, lines connecting the transducers C and D and the transducers A and B are substantially parallel permitting an accurate determination of asymmetry and thereby object rotation as described in detail in the '029 application. The system is capable of determining the pre-crash location of the critical parts of the occupant, such as his/her head and chest, and then to track their motion toward the airbag with readings as fast as once every 10 milliseconds. This is sufficient to determine the position and velocity of the occupant during a crash event. The implementation described in the '029 application can therefore to determine at what point the occupant will get sufficiently out-of-position so that deployment of the airbag should be suppressed. In the instant invention, the same data is used but instead of only making a trigger/no-trigger decision, the information is used to determine how fast to deploy the airbag, and if the weight of the occupant is also determined in a manner such as disclosed in U.S. patent application Ser. No. 08/474,784 cross-referenced above, the amount of gas which should be injected into the airbag and perhaps the out flow resistance can be controlled to optimize the airbag system not only based on the crash pulse but also the occupant properties. This provides the design for Phase 3 Smart Airbags.

In the above-referenced patent application Ser. No. 08/476,076, concern was expressed about a possible contention for processor resources when multiple systems were using the same microprocessor. This is no longer a problem with the availability of neural computer designs which can be incorporated into the ASIC for this system. Such designs utilize a parallel computing architecture to calculate all of the node calculations simultaneously. Furthermore, the neural computer can be made with as many input nodes as desired with little penalty in ASIC cost. Thus, both the calculation of the position of the occupant and the crash pulse analysis can occur at the same time.

In the neural network ASIC design, it is anticipated that, for most applications, the node weights will be read in at execution time. Therefore, a single neural network hardware design can perform many pattern recognition functions as long as the functions which share the neural computer do not need to be done at the same time. To the extent that this sharing can be done, each of these non-critical features can be added at very little additional cost once one system is implemented.

Although one implementation of an occupant sensing system has been shown in FIG. 3, naturally, other types of transducers or measurement means could be used without deviating from the teachings of this invention.

Figure 4:
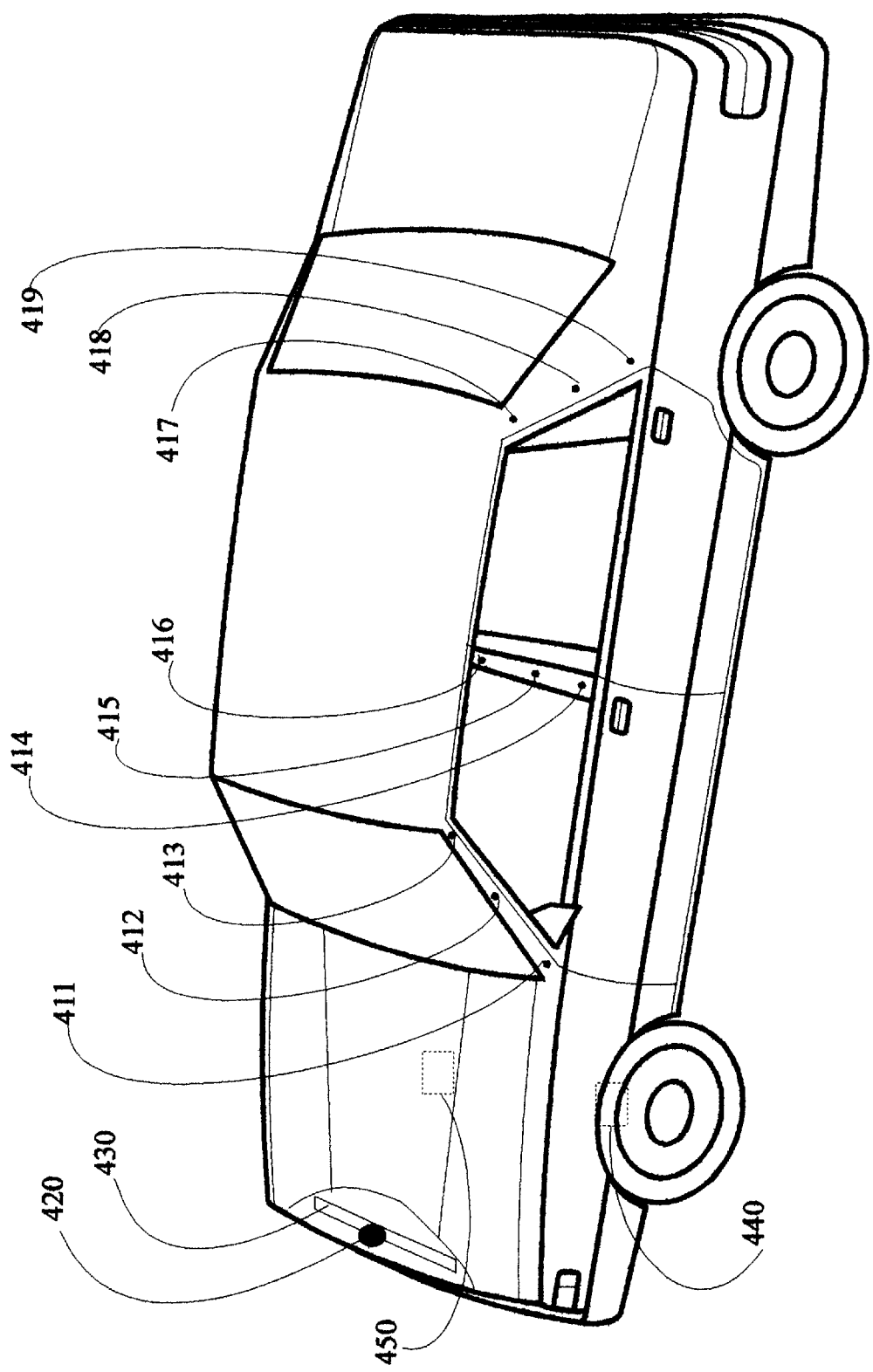
FIG. 4 is a perspective view of an automobile, as viewed partially from above, of a side impact anticipatory sensor system using the same computer as the single point crash sensor and also showing inputs from a front mounted crush zone sensor, an engine speed sensor, and an antilock braking system sensor.

FIG. 4 illustrates a side impact anticipatory sensor system, shown here as transducers 411–419 which are situated in different locations on one side of the vehicle, using the same computer system as discussed above, and coupled thereto by suitable means (the other side of the vehicle is provided with the same arrangement as discussed herein). These sensors can provide the data to permit the identification of an object which is about to impact the vehicle at that side as well as its velocity. An estimate can then be made of the object's weight and therefore the severity of the pending accident. This provides the information for the initial inflation of the side airbag before the accident begins. If additional information is provided from the occupant sensors, the deployment of the side airbag can be tailored to the occupant and the crash in a similar manner as described above. FIG. 4 also illustrates additional inputs which, in some applications, provide useful information in determining whether a side airbag should be deployed, for example. These include inputs from a front mounted crash sensor 420 mounted on the vehicle radiator 430, an engine speed sensor 450, and a wheel speed sensor 440 as used in the antilock braking system sensor.

The use of anticipatory sensing, as described above and in copending U.S. patent application Ser. No. 08/247,760 filed May 23, 1994, which is included herein by reference, can be used in a Phase 4 Smart Airbag system. This can be done with the anticipatory sensor acting in concert with or in place of the accelerometer-based neural network crash sensor described above. In the preferred embodiment, both sensors are used with the anticipatory sensor forecasting the crash severity before the collision occurs and the accelerometer based sensor confirming that forecast.

Collision avoidance systems currently under development use radar or laser radar to locate objects such as other vehicles which are in a potential path of the subject vehicle. In some systems, a symbol is projected onto the windshield in a heads-up display signifying that some object is within a possible collision space with the subject vehicle. No attempt at present is made to determine what that object is and to display an image of the object. Neural network pattern recognition systems, as well as other pattern recognition systems, have that capability and future collision avoidance systems may need this capability. Naturally, as above, the same pattern recognition computer system which is proposed herein for sensing crashes can also the used for collision avoidance pattern recognition as well as anticipatory sensing.

Figure 5:
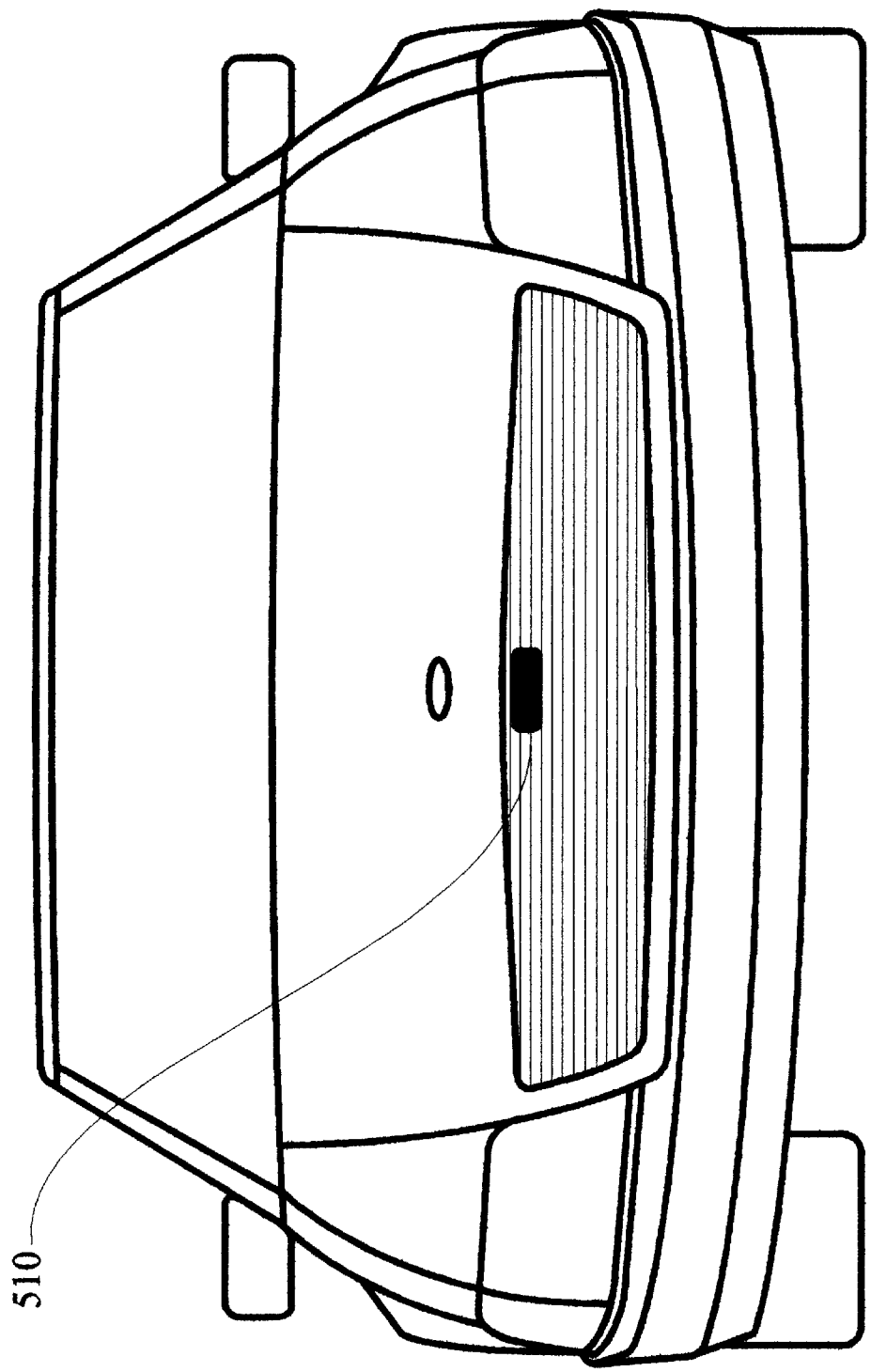
FIG. 5 is a frontal view of an automobile showing the location of an electromagnetic wave crash anticipatory or avoidance sensor which uses the same pattern recognition computer system as the crash sensor.

FIG. 5 is a frontal view of an automobile showing the location of an electromagnetic wave anticipatory or collision avoidance sensor 510 which can use the same neural computer system as the crash sensor discussed above and thus is coupled thereto. Heretofore, radar and laser radar systems have been developed for collision avoidance systems. It is noteworthy that no such systems have been fielded on a production vehicle due to the significant problems which remain to be solved. An alternate technology uses infrared electromagnetic waves and a receiver and processing system which both analyzes the image prior to illumination from the vehicle and after to achieve more information. The image is then digitized and fed into a neural network for analysis.

Figure 6:
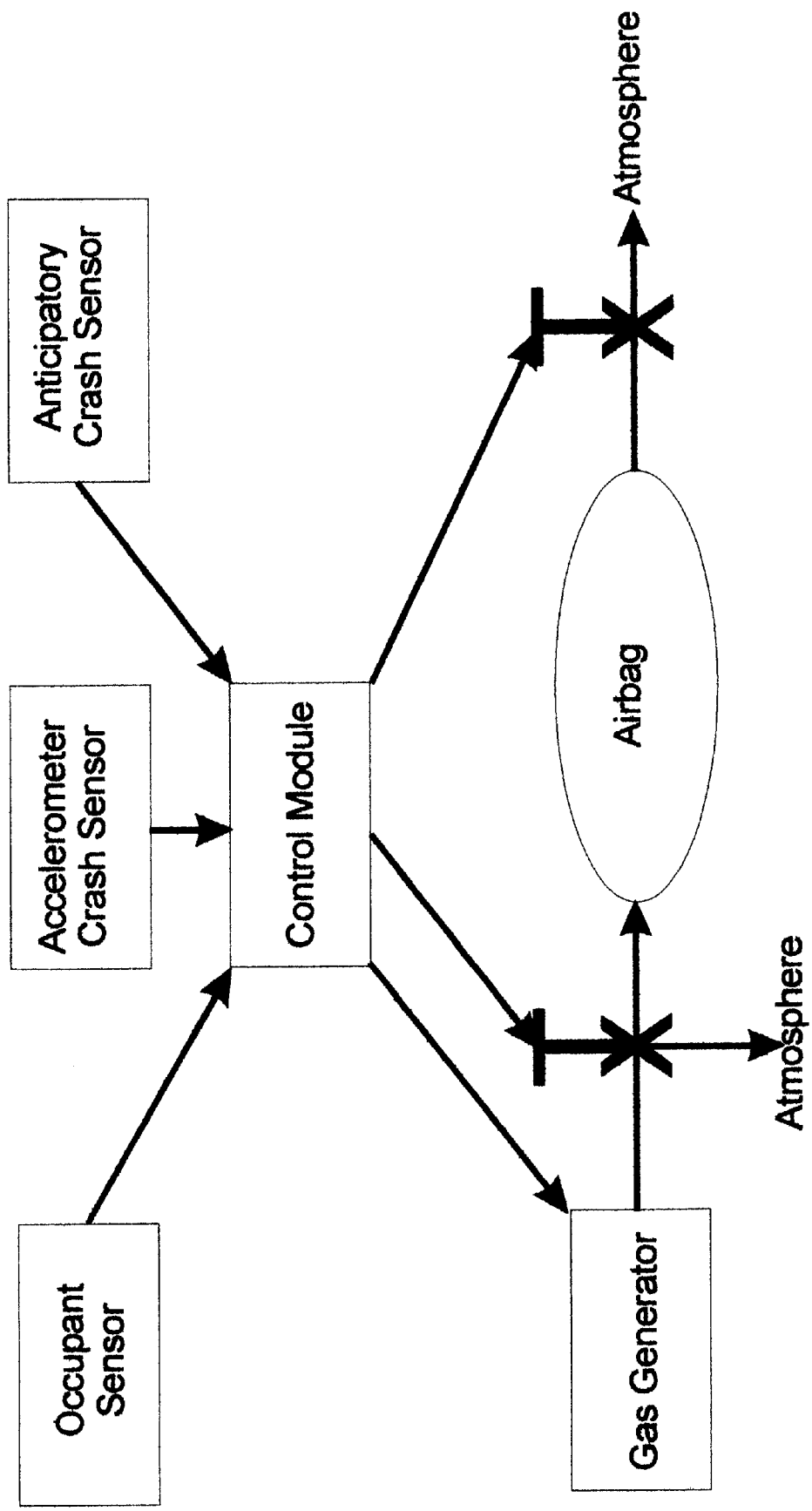
FIG. 6 is a schematic diagram showing a Phase 4 Smart Airbag System.

A schematic of an airbag gas control system in illustrated in FIG. 6 and follows the description presented above. Data from the occupant, accelerometer and anticipatory sensors are fed into the control module which controls one or more of: (i) the quantity of gas produced by the gas generator, (ii) the flow of the gas from the gas generator into the airbag or, alternately, the flow of a portion to the atmosphere before it enters the airbag, and (iii) the flow of the gas out of the airbag into the atmosphere.

The pattern recognition algorithm which forms an integral part of the crash sensor described herein can be implemented either as an algorithm using a conventional microprocessor or through a neural computer which is now readily available. In the former case, the training is accomplished using a neural pattern recognition program and the result is a computer algorithm frequently written in the C computer language, although many other computer languages such as FORTRAN, assembly, Basic, etc. could be used. In the latter case, the same neural computer can be used for the training as used on the vehicle. Neural network software for use on a conventional microcomputer is available from several sources such as NeuralWare of Pittsburgh, Pa. An example of an algorithm produced by the NeuralWare software after being trained on a crash library created by using data supplied by an automobile manufacturer for a particular model vehicle plus additional data created by using the techniques of crash and velocity scaling is illustrated in U.S. patent application Ser. No. 08/476,076 referenced above. In this case, the network was trained to give a value of 1 for triggering the airbag and 0 for not triggering. In the instant case, this value would depend on the type of gas control module which is used and in general would vary continuously from 0 to 1 with the particular value indicative of the action to be taken by the gas control module, such as adding more gas to the airbag.

As discussed above, neural computers on a chip are now readily available from various chip suppliers and can be easily incorporated into ASIC designs. These chips make use of a parallel architecture and allow all of the input data to be processed simultaneously. The result is that the computation time required for a pattern to be tested changes from the order of 100 milliseconds for the case of the microprocessor implemented system to the order of microseconds for the neural computer. With this computational speed, one neural computer can easily be used for several non-critical pattern recognition implementations simultaneously, except during the crash event. A discussion of the structure of such a neural computer can be found on page 382 of the reference book by Kung listed above.

Figure 7:
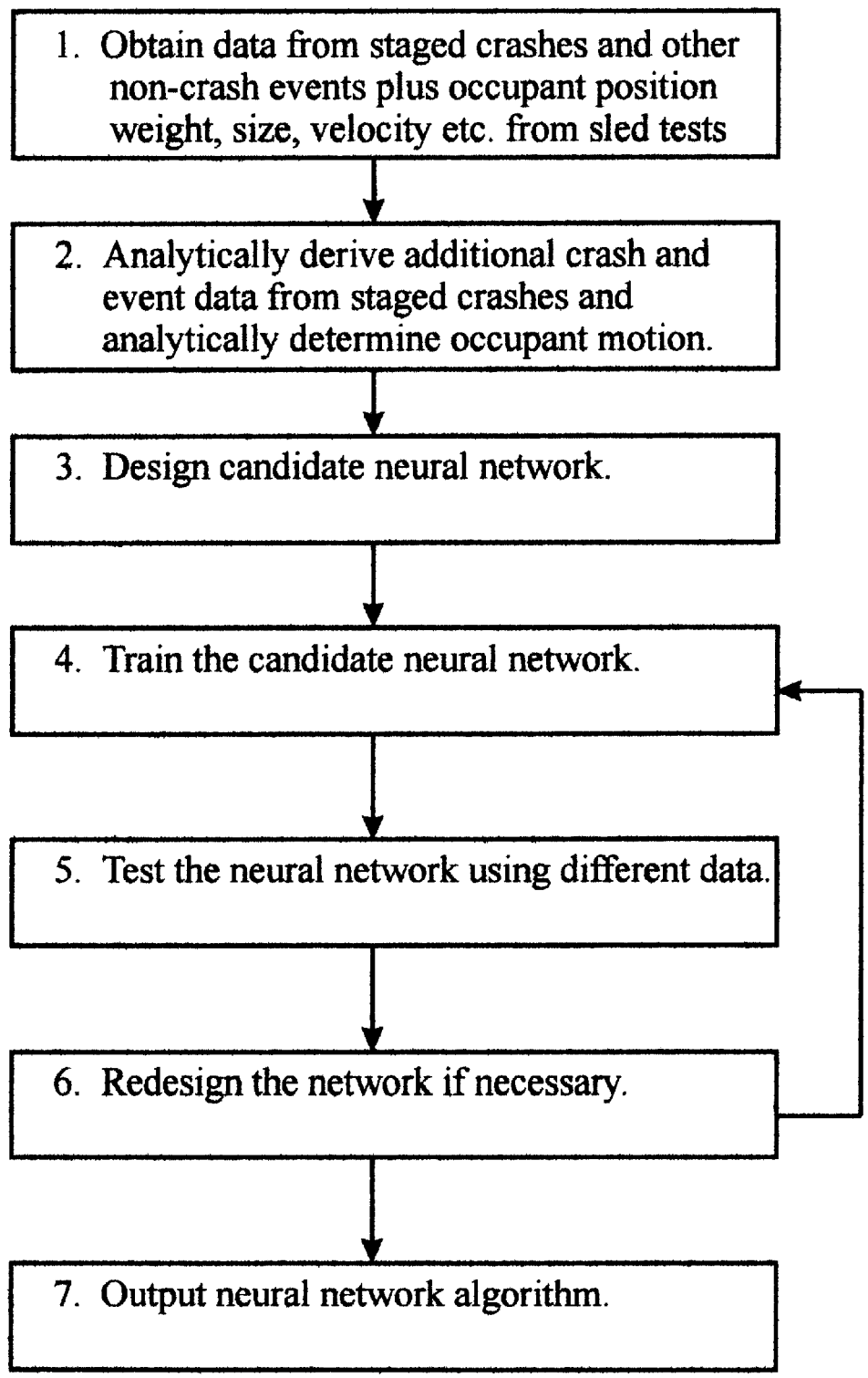
FIG. 7 is a block diagram illustrating a method of obtaining a sensor and prediction algorithm using a neural network.

A block diagram of the neural network computer method of obtaining a smart airbag algorithm is illustrated in FIG. 7. In the first step, one or more vehicle models are crashed under controlled conditions where the vehicle and crash dummies are fully instrumented so that the severity of the crash, and thus the need for an airbag, can be determined. An occupant sensor is also present and in use so that key occupant motion data can be obtained. The occupant data will be insufficient for the full neural network algorithm development but will provide important verification data. The acceleration during the crash is measured at all potential locations for mounting the crash sensor. Normally, any position which is rigidly attached to the main structural members of the vehicle is a good mounting location for the sensor.

The following crash event types, at various velocities, are representative of those which should be considered in establishing crash sensor designs and calibrations for frontal impacts:

Frontal Barrier Impact

Right Angle Barrier Impact

Left Angle Barrier Impact

Frontal Offset Barrier Impact

Frontal Far Offset (Outside of Rails) Barrier Impact

High Pole on Center Impact

High Pole off Center Impact

Low Pole (below bumper) Impact

Frontal Car-to-Car Impact

Partial Frontal Car-to-Car Impact

Angle car-to-car Impact

Front to Rear car-to-car Impact

Front to Side Car-to-Car Impact, Both Cars Moving

Bumper Underside Impact

Animal Impact—Simulated Deer

Undercarriage Impact (hangup on railroad track type of object)

Impact Into Highway Energy Absorbing Device (Yellow Barrels, etc.)

Impact Into Guardrail

Curb Impacts

The following non-crash event types are representative of those considered in establishing crash sensor designs and calibrations:

Hammer Abuse (shop abuse)

Rough Road (rough driving conditions)

Normally, a vehicle manufacturer will only be concerned with a particular vehicle model and instruct the crash sensor designer to design a sensor for that particular vehicle model. This is in general not necessary when using the techniques described herein and vehicle crash data from a variety of different vehicle models can be included in the training data.

Since the system is being designed for a particular vehicle model, static occupant data needs to be obtained for that particular model. Although crash data from one vehicle can be used for the training purposes, occupant data cannot in general be interchanged from one vehicle model to another vehicle model. Dynamic position data for an occupant will be in general be analytically derived based on the initial position and rules as to how the body translates and rotates which will be determined from sled and crash tests. This is not as complicated as might first appear since for most practical purposes, an unbelted occupant will just translate forward as a free mass and thus the initial position plus the acceleration of the vehicle allows a reasonably accurate determination of position over time. The problem is more complicated for the belted occupant and the rules governing occupant motion must be learned from modeling and verified by sled and crash tests. Fortunately, belted occupants are unlikely to move significantly during the critical part of the crash and thus the initial position at least for the chest is a good approximation.

The vehicle manufacturer will be loath to conduct all of the crashes listed above for a particular vehicle since crash tests are very expensive. If, on the other hand, a particular crash type which occurs in the real world is omitted from the library, there is a chance that the system will not perform optimally when the event occurs later and one or more people will unfortunately be killed or injured. One way to partially solve this dilemma is to use crash data from other vehicles as discussed above. Another method is to create data using the data obtained from the staged crash tests and operating on the data using various mathematical techniques which permits the creation of data which is representative of crashes not run. One method of accomplishing this is to use velocity and crash scaling as described in detail in the above referenced papers and particularly in reference 1) page 8 and reference 2) pages 37–49. This is the second step in the process illustrated in FIG. 7. Also included in the second step is the analytical determination of the occupant motion discussed above.

The third step is to assume a candidate neural network architecture. A choice which is moderately complex is suggested such as one with 100 input nodes and 6 hidden layer nodes. If the network is too simple, there will be cases for which the system cannot be trained and, if these are important crashes, the network will have to be revised by adding more nodes. If the initial choice is too complex, this will usually show up after the training with one or more of the weights having a near zero value. In any event, the network can be tested later by removing one node at a time to see if the accuracy of the network degrades. Alternately, genetic algorithms are used to search for the optimum network architecture. Naturally, a similar set of steps apply to other pattern recognition technologies.

The training data must.now be organized in a fashion similar to the way it will be seen on a vehicle during a crash. Although data from a previously staged crash is available for the full time period of the crash, the vehicle mounted system will only see the data one value at a time. Thus, the training data must be fed to the pattern recognition computer, or computer program, in that manner. This can be accomplished by taking each crash data file and creating 100 cases from it, assuming that the time period chosen for a crash is 200 milliseconds and that each data point is the pre-processed acceleration over two.milliseconds. This data must also be combined with the occupant data derived as discussed above. The first training case contains the first crash data point and the remaining 99 points are zero, or random small values for the crash data nodes, and the segmented occupant position data as described in the '029 application for the occupant nodes. Since the handling of the occupant data is described in that patent application, the remaining description here will be limited to the handling of the crash data. The second crash data case contains the first two data points with the remaining 98 points set to zero or random low values etc. For the tenth data file, data point one will contain the average acceleration at twenty milliseconds into the crash, data point two the average acceleration at eighteen milliseconds into the crash, and data point ten will contain the data from the first two milliseconds of the crash. This process is continued until the one hundred data cases are created for the crash. Each case is represented as a line of data in the training file. This same process must be done for each of the crashes and non-crash events for which there is data. A typical training set will finally contain on the order of 50,000 crash data cases and 500,000 occupant static data cases.

In the pure neural network crash sensor case as described in the '076 application, it was possible to substantially trim the data set to exclude all those cases for which there is no definite requirement to deploy the restraint, and the same is true here. For a particular 30 mph frontal barrier crash, for example, analysis of the crash has determined that the sensor must trigger the deployment of the airbag by 20 milliseconds. It is therefore not necessary to use data from that crash at less than 20 milliseconds since we are indifferent as to whether the sensor should trigger or not. Although data greater than 20 milliseconds is of little value from the point of view of a neural network crash sensor which only needs to determine whether to deploy the airbag since that would represent a late deployment, such is not the case here since, for some gas control modules, the inflation/deflation rate can be controlled after the decision to deploy. Also, the 20 millisecond triggering requirement is no longer applicable since it depends on the initial seating position of the occupant. For cases where the airbag should not trigger, on the other hand, the entire data set of 200 data files must be used. Finally, the training set must be balanced so that there are about as many no-trigger cases as trigger cases so that the output will not be biased toward one or the other decision. This then is the fourth step in the process as depicted in FIG. 7.

In the fifth step, the pattern recognition program is run with the training set. The program, if it is a neural network program, uses a variety of techniques such as the "back propagation" technique to assign weights to the connections from the input layer nodes to the hidden layer nodes and from the hidden layer nodes to the output layer nodes to try to minimize the error at the output nodes between the value calculated and the value desired. For example, for a particular crash such as a 30 mph frontal barrier impact, an analysis of the crash and the particular occupant has yielded the fact that the sensor must trigger in 20 milliseconds and the data file representing the first 20 milliseconds of the crash would have a desired output node value which would instruct the gas module to inject a particular amount of gas into the airbag. For another crash such as an 8 mph barrier crash where airbag deployment is not desired, the desired output value for all of the data lines which are used to represent this crash (100 lines) would have associated with them a desired output node value of 0 which corresponds to a command to the gas control module not to inject gas into the airbag. The network program then assigns different weights to the nodes until all of the airbag-deployment-not-desired cases have an output node value nearly equal to 0 and similarly all of the airbag-deployment-desired cases have an output value close to that which is required for the gas control module to inject the proper amount of gas into the airbag. The program finds those weights which minimize the error between the desired output values and the calculated output values.

The term weight is a general term in the art used to describe the mathematical operation which is performed on each datum at each node at one layer before it is inputted into a node at a higher layer. The data at input layer node 1, for example, will be operated on by a function which contains at least one factor which is determined by the training process. In general this factor, or weight, is different for each combination of an input node and hidden layer node. Thus, in the example above where there were 100 input nodes, 12 hidden layer nodes and 1 output node, there will in general be 1,212 weights which are determined by the neural network program during the training period. An example of a function used to operate on the data from one node before it is input to a higher level node is the sigmoid function:

In the usual back propagation trained network, let $O_{ij}$ be the output of node j in layer i, then the input to node k in layer i+1 is $$I_{i+1,k} = \Sigma_j W_{kj}^{(i)} O_{ij}$$

where $W_{kj}^{(i)}$ is the weight applied to the connection between node j in layer i and node k in layer i+1.

Then the output of node k in layer i+1 is found by transforming its input, for example, with the sigmoid function:

$$O_{i+1,k} = 1/(1+e^{-I_{i+1,k}})$$

and this is used in the input to the next, i+2, layer.

If the neural network is sufficiently complex, that is if it has many hidden layer nodes, and if the training set is small, the network may "memorize" the training set with the result that it can fail to respond properly on a slightly different case from those presented. This.is one of the problems associated with neural networks which is now being solved by more advanced pattern recognition systems including genetic algorithms which permits the determination of the minimum complexity network to solve a particular problem. Memorizing generally occurs only when the number of vectors in the training set is not sufficiently large compared to the number of weights. The goal is to have a network which generalizes from the data presented and therefore will respond properly to a new case which is similar to but only slightly different from one of the cases presented. The network can also effectively memorize the input data if many cases are nearly the same. It is sometimes difficult to determine this by looking at the network so it is important that the network not be trained on all available data but that some significant representative sample of the data be held out of the training set to be used to test the network. It is also important to have a training set which is very large (one hundred to one thousand times the number of weights or more is desirable). This is the function of step five, to test the network using data that it has not seen before, i.e., which did not constitute part of the training data.

Step six involves redesigning the network and then repeating steps three through five until the results are satisfactory. This step is automatically accomplished by some of the neural network software products available on the market.

The final step is to output the computer code for the algorithm and to program a microprocessor, or design an ASIC with a neural computer, with this code. One important feature of this invention is that the neural network system chosen is very simple and yet, because of the way that the data is fed to the network, all relevant calculations are made with a single network. There is no need, for example, to use an additional network to translate a prediction of a vehicle velocity change, and thus the crash severity, into a setting for the gas controller. In fact, to do this would be difficult since the entire time history would need to be considered. The output from the network is the setting of the gas controller in the preferred implementation. Naturally, there may be cases where some intermediate step might be desirable.

The steps described above and illustrated in FIG. 7 are for the case where a neural computer program is used to generate code which will be then used to program a standard microprocessor. Similar steps apply also to the case where a neural computer is used.

In FIG. 8, the results of a neural network pattern recognition algorithm, as presented in copending patent application Ser. No. 08/476,076 referenced above, for use as a single point crash sensor are presented for a matrix of crashes created according to the velocity and crash scaling techniques presented in the above-referenced papers. The table contains the results for different impact velocities (vertical column) and different crash durations (horizontal row). The results presented for each combination of impact velocity and crash duration consist of the displacement of an unrestrained occupant at the time that airbag deployment is initiated and 30 milliseconds later. This is presented here as an example of the superb results obtained from the use of a neural network crash sensor which forms the basis of the instant invention. In FIG. 8, the success of the sensor in predicting that the velocity change of the accident will exceed a threshold value is demonstrated. In the instant invention, this capability is extended to where the particular severity of the accident is (indirectly) determined and then used to set the flow of gas into or out of the airbag to optimize the airbag system for the occupant and the crash severity.

Airbags have traditionally been designed based on the assumption that 30 milliseconds of deployment time is available before the occupant, as represented by a dummy corresponding to the average male, has moved five inches. An occupant can be seriously injured or even killed by the deployment of the airbag if he or she is too close to the airbag when it deploys and in fact many people, particularly children and small adults, have now been so killed. It is known that this is particularly serious when the occupant.is against the airbag when it deploys which corresponds to about 12 inches of motion for the average male occupant, and it is also known that he will be uninjured by the deploying airbag when he has moved less than 5 inches when the airbag is completely deployed. These dimensions are based on the dummy which represents the average male, the so-called 50% male dummy, sitting in the mid-seating position. The threshold for significant injury is thus somewhere in between these two points and thus for the purposes of this table, two benchmarks have been selected as being approximations to the threshold of significant injury. These benchmarks are, based on the motion of an unrestrained occupant, (i) if the occupant has already moved 5 inches at the time that deployment in initiated, and (ii) if the occupant has moved 12 inches by the time that the airbag is fully deployed. Both benchmarks really mean that the occupant will be significantly interacting with the airbag as it is deploying. Other benchmarks could of course be used; however, it is believed that these two benchmarks are reasonable lacking a significant number of test results to demonstrate otherwise, at least for the 50% male dummy.

The tables shown in FIGS. 8 and 9, therefore, provide data as to the displacement of the occupant relative to the airbag at the time that deployment is initiated and 30 milliseconds later. If the first number is greater than 5 inches or the second number greater than 12 inches, it is assumed that there is a risk of significant injury and thus the sensor has failed to trigger the airbag in time. For these cases, the cell in the table has been shaded. As can be seen in FIG. 8, which represents the neural network crash sensor designed according to the teachings of this invention, none of the cells are shaded so the performance of the sensor is considered good.

The table shown in FIG. 9 represents a model of a single point crash sensor used on several production vehicle models in use today. In fact, it was designed to be optimized for the crashes shown in the table. As shown in FIG. 9, the sensor fails to provide timely airbag deployment in a significant percentage of the crashes represented in the table. Since that sensor was developed, several manufacturers have developed crash sensor algorithms by trial and error which probably perform better than that of FIG. 9. It is not possible to ascertain the success of these improved sensors since the algorithms are considered proprietary.

One additional feature, which results from the use of the neural network crash sensor of this invention, is that at the time the decision is made to deploy the airbag and even for as long afterward as the sensor is allowed to run, in the above example, 200 milliseconds of crash data is stored in the network input nodes. This provides a sort of "black box" which can be used later to accurately determine the severity of the crash as well as the position of the occupant at the time of the crash. Naturally, if some intermediate occupant positions are desired, they could be stored on a separate non-volatile memory.

One issue that remains to be discussed is the derivation of the relationship between the gas controller setting and the desired volume or quantity of gas in the airbag. Generally, for a low velocity, long duration threshold crash, for a small light weight out-of-position occupant, the airbag should be inflated slowly with a relatively small amount of gas and the out flow of gas from the airbag should be controlled so a minimum value constant pressure is maintained as the occupant just contacts the vehicle interior at the end of the crash. Similarly, for a high velocity crash with large heavy occupant, positioned far from the airbag before deployment is initiated, but with a significant forward relative velocity due to pre-crash braking, the airbag should be deployed rapidly with a high internal pressure and an out flow control which maintains a high pressure in the airbag as the occupant exhausts the airbag to the point where he almost contacts the interior vehicle surfaces at the end of the crash. These situations are quite different and require significantly different flow rates into and out of the airbag. As crash variability is introduced such as where a vehicle impacts a pole in front of a barrier, the gas flow decisions will be changed during the crash.

The neural network crash sensor has the entire history of the crash at each point in time and therefore knows what instructions it gave to the gas controller during previous portions of the crash. It therefore knows what new instructions to give the controller to account for new information. The problem is to determine the controller function when the occupant parameters and the crash forecasted severity are known. This requires the use of an occupant crash simulation program such as Madymo™ from TNO in Delft, The Netherlands, along with a model of the gas control module. A series of simulations are run with various settings of the controllable parameters such as the gas generation rate, gas inflow and gas outflow restriction until acceptable results are obtained and the results stored for that particular crash and occupant situation. In each case, the goal may be to maintain a constant pressure within the airbag during the crash once the initial deployment has occurred. Those results for each point in time are converted to a number and that number is the desired output of the neural network used during the training. A more automated approach is to couple the simulation model with the neural network training program so that the desired results for the training are generated automatically. Thus, as a particular case is being prepared as a training vector, the Madymo program is run which automatically determines the settings for the particular gas control module, through a trial and error process, and these settings are converted to a number and normalized which then become the desired output value of the output node of the neural network. Naturally, the above discussion is for illustration purposes only and there are many ways that the interface between the neural network system and the gas controller can be designed.

The descriptions above have concentrated on the control of the gas flows into and out of an airbag. Naturally, other parts of the occupant restraint system can also be controlled in a similar manner as the gas flows. In particular, various systems are now in use and others are being developed for controlling the force applied to the occupant by the seatbelt. Such systems use retractors or pretensioners, others use methods of limiting maximum the force exert by the seatbelt, while still others apply damping or energy absorbing devices to provide a velocity sensitive force to the occupant. To the extent that these systems can be actively controlled by the restraint system based on the pattern recognition techniques described herein, they are contemplated by this invention. Also, the crash accelerometer and occupant sensors have been the main inputs to the pattern recognition system as described above. This invention also contemplates the use of other available information such as seatbelt use, seat position, seat back position, vehicle velocity etc. as additional inputs into the pattern recognition system for particular applications depending on the availability of such information.

Although several preferred embodiments are illustrated and described above, there are possible combinations using other geometries, materials and different dimensions for the components and different forms of the neural network implementation that perform the same functions. Also, the neural network has been described as an example of one means of pattern recognition. Other pattern recognition means exist and still others are under development and will be available in the future. Such a system can be used to identify crashes requiring the deployment of an occupant restraint system and then, optionally coupled with additional information related to the occupant, for example, create a system which satisfies the requirements of one of the Smart Airbag Phases. Also, with the neural network system described above, the input data to the network may be data which has been pre-processed rather than the raw acceleration data either through a process called "feature extraction", as described in Green (U.S. Pat. No. 4,906,940) for example, or by integrating the data and inputting the velocity data to the system, for example. This invention is not limited to the above embodiments and should be determined by the following claims.

What is claimed is:

1. A motor vehicle, comprising:
   a deployable occupant protection apparatus for protecting at least one occupant of the vehicle in a crash, said occupant protection apparatus having an adjustable rate of deployment after initiation of deployment of said occupant protection apparatus; and
   a sensor system for controlling the deployment of said occupant protection apparatus, said sensor system comprising:
   (a) sensor means mounted on the vehicle for sensing accelerations of the vehicle and producing an analog signal representative thereof,
   (b) converting means for receiving said analog signal and for converting said analog signal into a digital signal;
   (c) processing means for receiving and processing said digital signal, said processing means comprising pattern recognition means for determining if said digital signal contains a pattern characteristic of a vehicle crash requiring deployment of said occupant protection apparatus and when said pattern recognition means determines that said digital signal contains a pattern characteristic of a vehicle crash requiring occupant protection, said pattern recognition means determining, based on said digital signal, a desired rate of deployment of said occupant protection apparatus after initiation of deployment of said occupant protection apparatus and producing a deployment control signal indicative of the desired rate of deployment of said occupant protection apparatus after initiation of deployment of said occupant protection apparatus; and (d) control means coupled to said processing means and responsive to said deployment control signal for deploying said occupant protection apparatus at the desired rate of deployment after initiation of deployment of said occupant protection apparatus.

2. The vehicle in accordance with claim 1, wherein said pattern recognition means comprises a neural network.

3. The vehicle in accordance with claim 1, wherein said converting means derive said digital signal from the integral of said analog signal.

4. The vehicle in accordance with claim 1, wherein said sensor means is mounted in a position on the vehicle so as to sense frontal impacts.

5. The vehicle in accordance with claim 1, wherein said processing means are structured and arranged to detect when the at least one occupant to be protected by said occupant protection apparatus is out-of-position and thereupon to suppress deployment of said occupant protection apparatus.

6. The vehicle in accordance with claim 1, further comprising a passenger seat and wherein said occupant protection apparatus is a passenger side airbag, said control means controlling the rate of a flow of inflation fluid into said passenger side airbag, said processing means being structured and arranged to detect the presence of a rear-facing child seat positioned on said passenger seat and thereupon to suppress deployment of said passenger side airbag.

7. The vehicle in accordance with claim 1, wherein said sensor means comprises an anticipatory sensor.

8. The vehicle in accordance with claim 1, wherein said sensor means comprise a sensor for a collision avoidance system.

9. The vehicle in accordance with claim 1, wherein said sensor means is mounted in a position on the vehicle so as to sense rear impacts.

10. The vehicle in accordance with claim 1, wherein said processing means comprise a neural computer coupled to said converting means.

11. The vehicle in accordance with claim 10, wherein said occupant protection apparatus is an airbag and said sensor means is mounted in a position on the vehicle so as to sense a frontal impact into the vehicle.

12. The vehicle in accordance with claim 10, further comprising detecting means for detecting at least one of the position, size, velocity and weight of the occupant to be protected by said occupant protection apparatus, said detecting means being structured and arranged to affect said control means in order to adjust the deployment rate of said occupant protection apparatus after initiation of deployment of the occupant protection apparatus depending on the detected at least one of the position, size, velocity and weight of the occupant.

13. The vehicle in accordance with claim 10, wherein said sensor means comprises an acceleration measurement system which measures accelerations in at least two directions.

14. The vehicle in accordance with claim 10, wherein additional data is input to said neural computer and said pattern recognition means uses said additional data.

15. The vehicle in accordance with claim 14, wherein said additional data comprises data from an anticipatory sensor.

16. The vehicle in accordance with claim 14, wherein said additional data comprises data from a collision avoidance sensor.

17. The vehicle in accordance with claim 10, wherein said neural computer diagnoses the apparatus readiness.

18. A method for obtaining an algorithm for use with a computer-based crash sensor to determine the deployment rate of a deployable occupant protection device having an adjustable deployment rate after initiation of deployment of the occupant protection device in a vehicle crash, comprising the steps of:

(a) obtaining digital crash data representative of the vehicle for which the crash sensor is intended to be used, said crash data being obtained from deployment desired crashes, crashes in which deployment is not desired and other events, the combination of all such crashes and events constituting a crash library for the vehicle;

(b) designing a candidate pattern recognition algorithm from said crash library;

(c) training said pattern recognition algorithm to produce an output of the desired inflation or deflation rate of the deployable occupant protection device after initiation of the deployment of the occupant protection device for the events of said crash library using a pattern recognition computer program and said crash library until control output errors are reduced to a minimum, resulting in a trained pattern recognition algorithm;

(d) testing said trained pattern recognition algorithm using additional crashes and events representative of the vehicle;

(e) optionally redesigning said trained pattern recognition algorithm when testing performance is unsatisfactory, and repeating training and testing steps (c) and (d); and (f) outputting from the pattern recognition program the resulting crash sensor and inflation control algorithm.

19. A method for sensing a crash of a vehicle to determine the deployment rate of a deployable occupant device having an adjustable deployment rate, comprising the steps of (a) obtaining an acceleration signal from an accelerometer mounted on the vehicle;

(b) converting said acceleration signal into a digital time series;

(c) entering said digital time series data into a first series of input nodes of a neural network;

(d) performing a mathematical operation on said data from each of said first series of input nodes and inputting said operated-on data into a second series of nodes wherein the operation performed on said data from each of said first series of input node prior to inputting the operated-on data to the second series node is different from the operation performed on the data from the others of said first series of input nodes;

(e) combining the operated-on data from all of the input nodes into each second series node to form a value at each second series node;

(f) performing a mathematical operation on each of said values on said second series of nodes and inputting said operated-on data into an output series of nodes wherein the operation performed on each of said second series node data prior to inputting the operated-on value to all output series node is different from that operation performed on some other second series node data;

(g) combining the operated-on data from all of the second series nodes into each output series node to form a value at each output series node indicative of a desired rate of deployment of said deployable device based on said acceleration signal; and (h) outputting a value to a gas flow control module from the output node to deploy said deployable device at the desired rate.

20. The method in accordance with claim 19, wherein a third series of nodes is placed between said second series of nodes and said output series of nodes and said operated-on data from said second series of nodes is input into said third series of nodes and operated on values from said third series of nodes is input into said output nodes.

21. A motor vehicle, comprising
a deployable occupant protection apparatus for protecting at least two occupants of the vehicle in a crash, said occupant protection apparatus having an adjustable rate of deployment;
a driver's seat occupiable by a driver;
a front passenger seat containing an object; and
a sensor system for initiating deployment of said occupant protection apparatus, said sensor system comprising:
(a) first sensor means for sensing accelerations of the vehicle and producing an analog output signal representative thereof;
(b) second sensor means for sensing the position of the driver relative to said deployable occupant protection apparatus;
(c) identification means for identifying the object occupying said front passenger seat;
(d) mounting means for mounting said first sensor means onto the vehicle;
(e) converting means coupled to said first sensor means for receiving said analog signal and for converting said analog signal into a digital signal;
(f) processing means coupled to said converting means and comprising pattern recognition means, said processing means determining a desired rate of gas flow into or out of said deployable occupant protection apparatus based on said digital signal and producing a deployment control signal indicative of the rate of gas flow into or out of said deployable occupant protection apparatus; and
(g) control means coupled to said processing means and responsive to said deployment control signal for deploying said occupant protection apparatus with the desired rate of gas flow into or out of said deployable occupant protection apparatus.

22. The vehicle in accordance with claim 21, wherein said pattern recognition means comprises a neural network.

23. A motor vehicle, comprising:
a deployable occupant protection apparatus for protecting at least one occupant of the vehicle in a crash, said occupant protection apparatus having an adjustable rate of deployment after initiation of deployment of said occupant protection apparatus; and
a sensor system for controlling the deployment of said occupant protection apparatus comprising:
a sensor mounted on the vehicle for sensing accelerations of the vehicle and producing a signal representative thereof;
a processor for receiving and processing said signal, said processor comprising pattern recognition means for determining if the processed signal contains a pattern characteristic of a vehicle crash requiring deployment of said occupant protection apparatus and when said pattern recognition means determines that the processed signal contains a pattern characteristic of a vehicle crash requiring occupant protection, said pattern recognition means determining, based on the processed signal, a desired rate of deployment of said occupant protection apparatus after initiation of deployment of said occupant protection apparatus and producing a deployment control signal indicative of the desired rate of deployment of said occupant protection apparatus after initiation of deployment of said occupant protection apparatus; and
a control unit coupled to said processor and responsive to said deployment control signal for deploying said occupant protection apparatus at the desired rate of deployment after initiation of deployment of said occupant protection apparatus.

24. A method for controlling deployment of an occupant protection device having an adjustable rate of deployment, comprising the steps of:
sensing accelerations of the vehicle;
determining whether a crash requiring deployment of the occupant protection device is occurring based on the sensed accelerations
initiating deployment of the occupant protection device when a crash requiring deployment of the occupant protection device is occurring; and
based on the sensed accelerations, controlling the deployment rate of the occupant protection device after initiation of the deployment of the occupant protection device.

* * * * *